US011190778B2

(12) United States Patent
An et al.

(10) Patent No.: US 11,190,778 B2
(45) Date of Patent: Nov. 30, 2021

(54) IMAGE FILTERING METHOD AND APPARATUS

(71) Applicant: Huawei Technologies Co., Ltd., Shenzhen (CN)

(72) Inventors: Jicheng An, Shenzhen (CN); Jianhua Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/577,507

(22) Filed: Sep. 20, 2019

(65) Prior Publication Data
US 2020/0021822 A1 Jan. 16, 2020

Related U.S. Application Data

(63) Continuation of application No. PCT/CN2017/115683, filed on Dec. 12, 2017.

(30) Foreign Application Priority Data

Mar. 22, 2017 (WO) ................ PCT/CN2017/077750

(51) Int. Cl.
*H04B 1/66* (2006.01)
*H04N 19/186* (2014.01)
(Continued)

(52) U.S. Cl.
CPC ........... *H04N 19/186* (2014.11); *G06T 5/009* (2013.01); *G06T 5/20* (2013.01); *H04N 19/176* (2014.11); *H04N 19/64* (2014.11)

(58) Field of Classification Search
CPC .... H04N 19/176; H04N 19/70; H04N 19/105; H04N 19/117; H04N 19/593;
(Continued)

(56) References Cited

U.S. PATENT DOCUMENTS 7,742,110 B1 6/2010 Woodall
2003/0086026 A1 5/2003 Kim
(Continued)

FOREIGN PATENT DOCUMENTS

CN 1806439 A 7/2006
CN 101009842 A 8/2007
(Continued)

OTHER PUBLICATIONS

Adaptive Loop Filtering for Video Coding by Chia-Yang Tsai, Member, IEEE, Ching-Yeh Chen, Tomoo Yamakage, In Suk Chong, Yu-Wen Huang, Chih-Ming Fu, Takayuki Itoh, Takashi Watanabe, Takeshi Chujoh, Marta Karczewicz, and Shaw-Min Lei, Fellow, IEEE IEEE Journal of Selected Topics in Signal Processing (Year: 2013).*
Machine Translation and Abstract of Chinese Publication No. CN101009842, Aug. 1, 2007, 23 pages.
Machine Translation and Abstract of Chinese Publication No. CN104683819, Jun. 3, 2015, 13 pages.
(Continued)

*Primary Examiner* — Masum Billah
(74) *Attorney, Agent, or Firm* — Conley Rose, P.C.

(57) ABSTRACT

An image filtering method and apparatus, where the method includes determining a filter coefficient of a chroma filter based on a filter coefficient of a luma filter, where the luma filter and the chroma filter are respectively applied to perform filtering processing on luma samples and chroma samples of a to-be-processed image, all filter coefficients of the luma filter present a first geometric distribution, all filter coefficients of the chroma filter present a second geometric distribution, the first geometric distribution and the second geometric distribution are similar shapes, and a filter coefficient of the chroma filter at an edge of the second geometric distribution is calculated using one or more filter coefficients of the luma filter at an edge of the first geometric distribution, and respectively performing filtering processing on the luma samples and the chroma samples using the luma filter and the chroma filter.

27 Claims, 11 Drawing Sheets

(51) Int. Cl.
*G06T 5/00* (2006.01)
*H04N 19/176* (2014.01)
*H04N 19/64* (2014.01)
*G06T 5/20* (2006.01)

(58) Field of Classification Search
CPC .... H04N 19/186; H04N 19/159; H04N 19/82; H04N 19/52; H04N 19/11; H04N 19/46; H04N 19/119; H04N 19/14; H04N 19/13; H04N 19/139; H04N 19/91
USPC .......................................................... 375/240
See application file for complete search history.

(56) References Cited

U.S. PATENT DOCUMENTS

| | | | |
|---|---|---|---|
| 2011/0274158 A1 | 11/2011 | Fu et al. | |
| 2013/0101018 A1* | 4/2013 | Chong | H04N 19/82 375/240.02 |
| 2013/0113880 A1 | 5/2013 | Zhao et al. | |
| 2013/0259118 A1 | 10/2013 | Fu et al. | |
| 2013/0266060 A1 | 10/2013 | Budagavi | |
| 2015/0350648 A1 | 12/2015 | Fu et al. | |
| 2017/0238020 A1* | 8/2017 | Karczewicz | H04N 19/82 375/240.29 |

FOREIGN PATENT DOCUMENTS

| | | | |
|---|---|---|---|
| CN | 102804776 A | | 11/2012 |
| CN | 103370936 A | | 10/2013 |
| CN | 103891293 A | | 6/2014 |
| CN | 104683819 A | | 6/2015 |
| CN | 104735450 A | * | 6/2015 |
| CN | 104735450 A | | 6/2015 |
| CN | 104780383 A | | 7/2015 |
| EP | 1636987 B1 | | 10/2015 |

OTHER PUBLICATIONS

Machine Translation and Abstract of Chinese Publication No. CN104735450, Jun. 24, 2015, 26 pages.
Machine Translation and Abstract of Chinese Publication No. CN104780383, Jul. 15, 2015, 9 pages.
Tsai, C., et al. "Adaptive Loop Filtering for Video Coding," IEEE Journal of Selected Topics in Signal Processing, vol. 7, No. 6, Dec. 2013, pp. 934-945.
"Series H: Audiovisual and Multimedia Systems, Infrastructure of audiovisual services—Coding of moving video, High efficiency video coding," ITU-T H.265, Dec. 2016, 664 pages.
Foreign Communication From A Counterpart Application, PCT Application No. PCT/CN2017/077750, English Translation of International Search Report dated Dec. 26, 2017, 2 pages.
Foreign Communication From A Counterpart Application, PCT Application No. PCT/CN2017/077750, English Translation of Written Opinion dated Dec. 26, 2017, 5 pages.
Foreign Communication From A Counterpart Application, PCT Application No. PCT/CN2017/115683, English Translation of International Search Report dated Feb. 26, 2018, 2 pages.
Foreign Communication From A Counterpart Application, PCT Application No. PCT/CN2017/115683, English Translation of Written Opinion dated Feb. 26, 2018, 3 pages.
An, J., et al., "Unified Adaptive Loop Filter for Luma and Chroma," Joint Video Exploration Team (JVET) of ITU-T SG 16 WP 3 and ISO/IEC JTC 1/SC 29/WG 11, JVET-E0079-v4, 5th Meeting, XP030150566, Jan. 12-20, 2017, 6 pages.
Chen, J., et al., "Algorithm Description of Joint Exploration Test Model 5 (JEM 5)", Joint Video Exploration Team (JVET) of ITU-T SG 16 WP 3 and ISO/IEC JTC 1/SC 29/WG 11, No. JVET-E1001-v2, 5th Meeting, XP030150648, Jan. 12-20, 2017, 44 pages.
An, J., et al., "Unified Adaptive Loop Filter for Luma and Chroma," Joint Video Exploration Team (JVET) of ITU-T SG 16 WP 3 and 1SO/IEC JTC 1/SC 29/WG 11, JVET-F0051, 6th Meeting, XP030150710, Mar. 31-Apr. 7, 2017, 7 pages.

* cited by examiner

IMAGE FILTERING METHOD AND APPARATUS

CROSS-REFERENCE TO RELATED APPLICATIONS

This application is a continuation of International Patent Application No. PCT/CN2017/115683 filed on Dec. 12, 2017, which claims priority to International Patent Application No. PCT/CN2017/077750 filed on Mar. 22, 2017. The disclosures of the aforementioned applications are hereby incorporated by reference in their entireties.

TECHNICAL FIELD

This application relates to the field of video and image encoding and decoding technologies, and in particular, to an image filtering method and apparatus.

BACKGROUND

Digital video apparatuses such as digital televisions, digital live broadcast systems, wireless broadcast systems, personal digital assistant (PDA), laptop or desktop computers, digital cameras, digital recording apparatuses, digital media players, video game apparatuses, video game consoles, cellular or satellite radio telephones, and video conferencing apparatuses are currently widely used. The digital video apparatus usually compresses a video using a video compression technology with a block-based hybrid video encoding framework, for example, Moving Picture Experts Group (MPEG)-1/2 or the latest video encoding standard H.265/high efficiency video coding (HEVC) in order to transmit, receive, and store digital video information more efficiently.

Adaptive loop filter (ALF) is one of important technologies for video encoding and decoding. In ALF, a reconstructed image obtained through encoding/decoding is filtered to improve quality of the reconstructed image and reduce distortion of the image.

In ALF, when filtering processing is being performed on an image, a luma sample and a chroma sample are separately processed, and respective filter coefficients are separately transmitted for the luma sample and the chroma sample. Consequently, bit rate overheads for transmission increase.

SUMMARY

This application provides an image filtering method and apparatus to reduce bit rate overheads for transmission.

According to a first aspect, an image filtering method is provided, where the method includes determining a filter coefficient of a chroma filter based on a filter coefficient of a luma filter, where the luma filter and the chroma filter are respectively applied to perform filtering processing on luma samples and chroma samples of a to-be-processed image, all filter coefficients of the luma filter present a first geometric distribution, all filter coefficients of the chroma filter present a second geometric distribution, the first geometric distribution and the second geometric distribution are similar shapes, and a filter coefficient of the chroma filter at an edge of the second geometric distribution is calculated using one or more filter coefficients of the luma filter at an edge of the first geometric distribution, and respectively performing filtering processing on the luma samples and the chroma samples using the luma filter and the chroma filter.

The filter coefficient of the chroma filter may be determined based on the filter coefficient of the luma filter such that during bitstream transmission, only a bitstream corresponding to the filter coefficient of the luma filter needs to be transmitted, thereby reducing to-be-transmitted bitstreams.

With reference to the first aspect, in some implementations of the first aspect, determining a filter coefficient of a chroma filter based on a filter coefficient of a luma filter includes determining a third-type filter coefficient of the chroma filter based on a first-type filter coefficient of the luma filter, and determining a fourth-type filter coefficient of the chroma filter based on a second-type filter coefficient of the luma filter, where the fourth-type filter coefficient is a filter coefficient of the chroma filter at the edge of the second geometric distribution, the third-type filter coefficient is a filter coefficient of the chroma filter other than the fourth-type filter coefficient, the first-type filter coefficient is a filter coefficient at a same location relative to a geometric center in the first geometric distribution as the third-type filter coefficient relative to a geometric center in the second geometric distribution, and the second-type filter coefficient is a filter coefficient of the luma filter other than the first-type filter coefficient.

Because the luma sample processed using the luma filter and the chroma sample processed using the chroma filter are located at a same sampling location, a relatively desirable filtering effect can be achieved by performing filtering processing on the chroma sample using the chroma filter determined based on the luma filter.

With reference to the first aspect, in some implementations of the first aspect, determining a third-type filter coefficient of the chroma filter based on a first-type filter coefficient of the luma filter includes assigning a value of a first luma filter coefficient in the first-type filter coefficient to a first chroma filter coefficient in the third-type filter coefficient, where a location of the first chroma filter coefficient relative to the geometric center in the second geometric distribution is the same as a location of the first luma filter coefficient relative to the geometric center in the first geometric distribution.

With reference to the first aspect, in some implementations of the first aspect, the luma filter is a tap filter with 9×9 diamond shape, the chroma filter is a tap filter with 5×5 diamond shape, the first geometric distribution is a 9×9 diamond distribution, the second geometric distribution is a 5×5 diamond distribution, the first-type filter coefficient includes L20, L12, and L19, and the third-type filter coefficient includes C6, C2, and C5, where the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a raster scanning order, and the filter coefficients of the chroma filter are C0, C1, C2, C3, C4, C5, C6, C5, C4, C3, C2, C1, and C0 in the 5×5 diamond distribution based on a raster scanning order, and assigning a value of a first luma filter coefficient in the first-type filter coefficient to a first chroma filter coefficient in the third-type filter coefficient includes respectively using L20, L12, and L19 as C6, C2, and C5.

With reference to the first aspect, in some implementations of the first aspect, the luma filter is a tap filter with 7×7 diamond shape, the chroma filter is a tap filter with 5×5 diamond shape, the first geometric distribution is a 7×7 diamond distribution, the second geometric distribution is a 5×5 diamond distribution, the first-type filter coefficient includes M12, M6, and M11, and the third-type filter coefficient includes C6, C2, and C5, where the filter coefficients of the luma filter are M0, M1, M2, M3, M4, M5, M6, M7, M8, M9, M10, M11, M12, M11, M10, M9, M8, M7, M6, M5, M4, M3, M2, M1, and M0 in the 7×7 diamond distribution based on a raster scanning order, and the filter coefficients of the chroma filter are C0, C1, C2, C3, C4, C5, C6, C5, C4, C3, C2, C1, and C0 in the 5×5 diamond distribution based on a raster scanning order, and assigning a value of a first luma filter coefficient in the first-type filter coefficient to a first chroma filter coefficient in the third-type filter coefficient includes respectively using M12, M6, and M11 as C6, C2, and C5.

With reference to the first aspect, in some implementations of the first aspect, determining a fourth-type filter coefficient of the chroma filter based on a second-type filter coefficient of the luma filter includes using a sum of a value of a second luma filter coefficient in the second-type filter coefficient and a value of at least one third luma filter coefficient that has a neighborhood relationship with the second luma filter coefficient, as a value of a second chroma filter coefficient in the fourth-type filter coefficient, where a location of the second chroma filter coefficient relative to the geometric center in the second geometric distribution is the same as a location of the second luma filter coefficient relative to the geometric center in the first geometric distribution.

With reference to the first aspect, in some implementations of the first aspect, the at least one third luma filter coefficient that has a neighborhood relationship with the second luma filter coefficient includes a second-type filter coefficient adjacent to or spaced by K from the second luma filter coefficient in the first geometric distribution, where K is an integer greater than or equal to 1.

With reference to the first aspect, in some implementations of the first aspect, the at least one third luma filter coefficient that has a neighborhood relationship with the second luma filter coefficient includes a second-type filter coefficient that is adjacent to or spaced by K from the second luma filter coefficient in the first geometric distribution and that is farther from the geometric center in the first geometric distribution than the second luma filter coefficient, where K is an integer greater than or equal to 1.

With reference to the first aspect, in some implementations of the first aspect, the luma filter is a tap filter with 9×9 diamond shape, the chroma filter is a tap filter with 5×5 diamond shape, the first geometric distribution is a 9×9 diamond distribution, the second geometric distribution is a 5×5 diamond distribution, the second-type filter coefficient includes L0, L1, L2, L3, L4, L5, L6, L7, L8, L9, L10, L11, L13, L14, L15, L16, L17, and L18, and the fourth-type filter coefficient includes C0, C1, C3, and C4, where the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a raster scanning order, and the filter coefficients of the chroma filter are C0, C1, C2, C3, C4, C5, C6, C5, C4, C3, C2, C1, and C0 in the 5×5 diamond distribution based on a raster scanning order, and using a sum of a value of a second luma filter coefficient in the second-type filter coefficient and a value of at least one third luma filter coefficient that has a neighborhood relationship with the second luma filter coefficient, as a value of a second chroma filter coefficient in the fourth-type filter coefficient includes using a sum of L1, L2, L3, L0, and L6 as C0, using a sum of L4, L5, L10, and L11 as C1, using a sum of L7, L8, L13, and L14 as C3, and using a sum of L9, L15, L16, L17, and L18 as C4.

With reference to the first aspect, in some implementations of the first aspect, the luma filter is a tap filter with 7×7 diamond shape, the chroma filter is a tap filter with 5×5 diamond shape, the first geometric distribution is a 7×7 diamond distribution, the second geometric distribution is a 5×5 diamond distribution, the second-type filter coefficient includes M0, M1, M2, M3, M4, M5, M7, M8, M9, and M10, and the fourth-type filter coefficient includes C0, C1, C3, and C4, where the filter coefficients of the luma filter are M0, M1, M2, M3, M4, M5, M6, M7, M8, M9, M10, M11, M12, M11, M10, M9, M8, M7, M6, M5, M4, M3, M2, M1, and M0 in the 7×7 diamond distribution based on a raster scanning order, and the filter coefficients of the chroma filter are C0, C1, C2, C3, C4, C5, C6, C5, C4, C3, C2, C1, and C0 in the 5×5 diamond distribution based on a raster scanning order, and using a sum of a value of a second luma filter coefficient in the second-type filter coefficient and a value of at least one third luma filter coefficient that has a neighborhood relationship with the second luma filter coefficient, as a value of a second chroma filter coefficient in the fourth-type filter coefficient includes using a sum of M0 and M2 as C0, using a sum of M1, M4, and M5 as C1, using a sum of M3, M8, and M7 as C3, and using a sum of M9 and M10 as C4.

With reference to the first aspect, in some implementations of the first aspect, the method further includes determining that a quantity of taps of the luma filter is greater than or equal to a preset value.

With reference to the first aspect, in some implementations of the first aspect, determining a filter coefficient of a chroma filter based on a filter coefficient of a luma filter includes determining a quantity of taps of the luma filter, and using the filter coefficient of the luma filter as the filter coefficient of the chroma filter when the quantity of taps of the luma filter is less than a preset value.

When the quantity of taps of the luma filter is relatively small, the filter coefficient of the luma filter may be directly used as the filter coefficient of the chroma filter (in this case, a same filter is used to perform filtering processing on the luma samples and the chroma samples), thereby simplifying a process of determining the filter coefficient of the chroma filter.

With reference to the first aspect, in some implementations of the first aspect, using the filter coefficient of the luma filter as the filter coefficient of the chroma filter includes using a fourth luma filter coefficient of the luma filter as a fourth chroma filter coefficient of the chroma filter, where a location of the fourth chroma filter coefficient relative to a geometric center in the second geometric distribution is the same as a location of the fourth luma filter coefficient relative to a geometric center in the first geometric distribution.

With reference to the first aspect, in some implementations of the first aspect, before determining a filter coefficient of a chroma filter based on a filter coefficient of a luma filter, the method further includes determining types of the luma samples to obtain a plurality of luma sample types, determining types of the chroma samples to obtain a plurality of chroma sample types, where any one of the plurality of chroma sample types is the same as a luma sample type corresponding to a same sampling location, and determining luma filtering identification information of a luma sample, where the luma filtering identification information is used to instruct to perform filtering processing on the luma sample and a chroma sample at a corresponding sampling location.

Compared with a manner in which whether filtering is to be performed can be chosen only for a chroma sample (that is Cb or Cr component) of an entire image, a chroma sample and a luma sample at a same sampling location are controlled using a same filtering enabling/disabling function such that enabling/disabling control can be implemented on a chroma sample at a finer granularity, thereby flexibly controlling filtering processing on the chroma sample and achieving a better filtering effect.

With reference to the first aspect, in some implementations of the first aspect, the method is applied to a decoder, and before determining a filter coefficient of a chroma filter based on a filter coefficient of a luma filter, the method further includes parsing a bitstream to obtain the filter coefficient of the luma filter.

With reference to the first aspect, in some implementations of the first aspect, the method is applied to an encoder, and the method further includes encoding the filter coefficient of the luma filter.

During encoding, the encoder only needs to encode the filter coefficient of the luma filter, and does not need to encode the filter coefficient of the chroma filter, thereby reducing bitstreams that need to be transmitted.

In a specific implementation, the image filtering method includes determining a filter coefficient of a chroma filter based on a filter coefficient of a luma filter, where the luma filter and the chroma filter are respectively applied to perform filtering processing on luma samples and chroma samples of a to-be-processed image, a filter coefficient distribution of the luma filter is shown in FIG. 6, and a filter coefficient distribution of the chroma filter is shown in FIG. 9, and respectively performing filtering processing on the luma samples and the chroma samples using the luma filter and the chroma filter, where a relationship between filter coefficients of the luma filter and filter coefficients of the chroma filter is as follows: C6=L20, C2=L12, C5=L19, C0=11×L1+12×L2+13×L3+10×L0+16×L6, C1=14×L4+15×L5+110×L10+111×L11, C3=17×L7+18×L8+113×L13+114×L14, and C4=19×L9+115×L15+116×L16+117×L17+118×L18, where 11, 12, 13, 10, 16, 14, 15, 110, 111, 17, 18, 113, 114, 19, 115, 116, 117, and 118 are weighting coefficients.

In a specific implementation, each of the weighting coefficients 11, 12, 13, 10, 16, 19, 115, 116, 117, and 118 is 1.

In a specific implementation, each of the weighting coefficients 14, 15, 110, 111, 17, 18, 113, and 114 is 1.

In another specific implementation, the image filtering method includes determining a filter coefficient of a chroma filter based on a filter coefficient of a luma filter, where the luma filter and the chroma filter are respectively applied to perform filtering processing on luma samples and chroma samples of a to-be-processed image, a filter coefficient distribution of the luma filter is shown in FIG. 17, and a filter coefficient distribution of the chroma filter is shown in FIG. 9, and respectively performing filtering processing on the luma samples and the chroma samples using the luma filter and the chroma filter, where a relationship between filter coefficients of the luma filter and filter coefficients of the chroma filter is as follows: C6=L8, C5=L7, C2=L3, C1=L2, C3=L4, C0=c0×L0+c1×L1, and C4=c5×L5+c6×L6, where c0, c1, c5, and c6 are weighting coefficients.

It should be understood that in this embodiment, all the filter coefficients of the luma filter present a first geometric distribution, all the filter coefficients of the chroma filter present a second geometric distribution, and the first geometric distribution and the second geometric distribution are similar shapes, but are not similar images. However, it remains unchanged that a filter coefficient of the chroma filter at an edge of the second geometric distribution is calculated using one or more filter coefficients of the luma filter at an edge of the first geometric distribution.

In another specific implementation, each of the weighting coefficients c0, c1, c5, and c6 is 1.

According to a second aspect, an image filtering apparatus is provided, where the image filtering apparatus includes a module configured to perform the method in any one of the first aspect or the various implementations of the first aspect.

According to a third aspect, an image filtering apparatus is provided, where the apparatus includes a non-volatile storage medium and a central processing unit, the non-volatile storage medium stores an executable program, and the central processing unit is connected to the non-volatile storage medium, and executes the executable program to implement the method in any one of the first aspect or the various implementations of the first aspect.

According to a fourth aspect, a computer readable medium is provided, where the computer readable medium stores program code to be executed by a device, and the program code includes an instruction used to perform the method in any one of the first aspect or the various implementations of the first aspect.

It should be understood that technical solutions provided in the second aspect to the fourth aspect of the present disclosure are consistent with technical solutions and technical means provided in the first aspect, and beneficial effects of the technologies are similar, and therefore details are not described again.

DESCRIPTION OF DRAWINGS

FIG. 7 is a schematic diagram of a tap filter with 7×7 diamond shape.

DESCRIPTION OF EMBODIMENTS

The following describes the technical solutions in the embodiments of this application with reference to the accompanying drawings in the embodiments of this application.

For better understanding of the embodiments of this application, the following first describes a YCbCr model, a luma sample, and a chroma sample in the embodiments of this application.

The YCbCr model is a color model different from a red, green, and blue (RGB) model. Luma and chroma are represented together in the RGB model, while luma and chroma are separately represented in the YCbCr model. The YCbCr model includes three components Y, Cb, and Cr, where Y is a luma component, Cb is a first chroma component, and Cr is a second chroma component (certainly, Cr may be referred to as a first chroma component, and Cb may be referred to as a second chroma component). The first chroma component and the second chroma component may be collectively referred to as a chroma component.

Therefore, samples (pixels) of an image based on the YCbCr model include a luma sample (pixel), a first chroma sample (pixel), and a second chroma sample (pixel). The first chroma sample and the second chroma sample may be collectively referred to as a chroma sample.

Samples of an image based on the YCbCr model are sampled in different sampling formats. The following briefly describes several common sampling formats: 4:4:4, 4:2:2, 4:1:1, and 4:2:0 respectively with reference to FIG. 1 to FIG. 4.

In FIG. 1 to FIG. 4, each small rectangle represents one sample, and different circles respectively represent luma sampling, first-chroma sampling, and second-chroma sampling.

Figure 1:
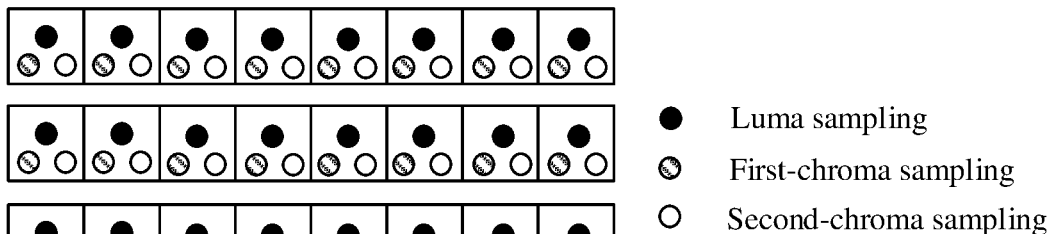
FIG. 1 is a schematic diagram of a 4:4:4 sampling format.

As shown in FIG. 1, luma sampling and chroma sampling (including first-chroma sampling and second-chroma sampling) are performed on each sample. That is, on every four samples, luma sampling is performed four times, first-chroma sampling is performed four times, and second-chroma sampling is performed four times. This sampling format is referred to as 4:4:4.

A human eye is more sensitive to luma than chroma. Therefore, to reduce bit rate overheads, a chroma sampling ratio may usually be less than a luma sampling ratio when samples of an image based on the YCbCr model are sampled (as shown in FIG. 2 to FIG. 4, luma sampling is performed on each sample, and chroma sampling may be performed once on every two or four samples).

Figure 2:
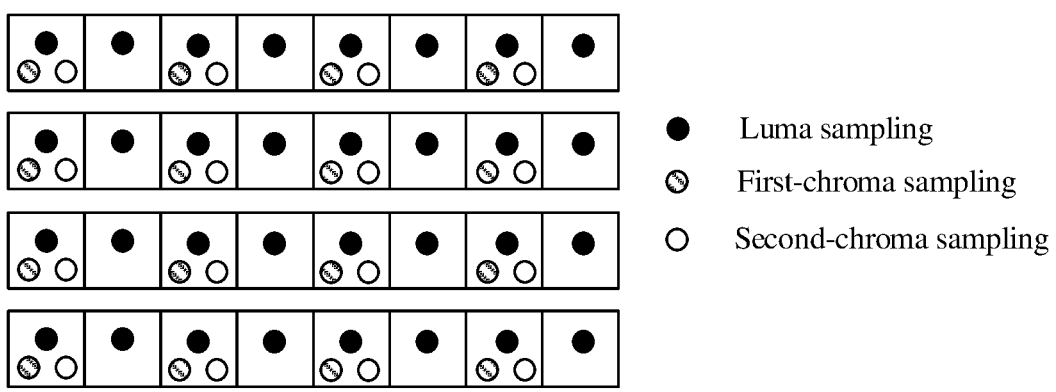
FIG. 2 is a schematic diagram of a 4:2:2 sampling format.

As shown in FIG. 2, luma sampling is performed on each sample, and chroma sampling is performed once on every two samples in a horizontal direction. That is, on every four samples, luma sampling is performed four times, first-chroma sampling is performed twice, and second-chroma sampling is performed twice. This sampling format is referred to as 4:2:2. In FIG. 2, a sampling ratio of first chroma or second chroma is half of a luma sampling ratio.

Figure 3:
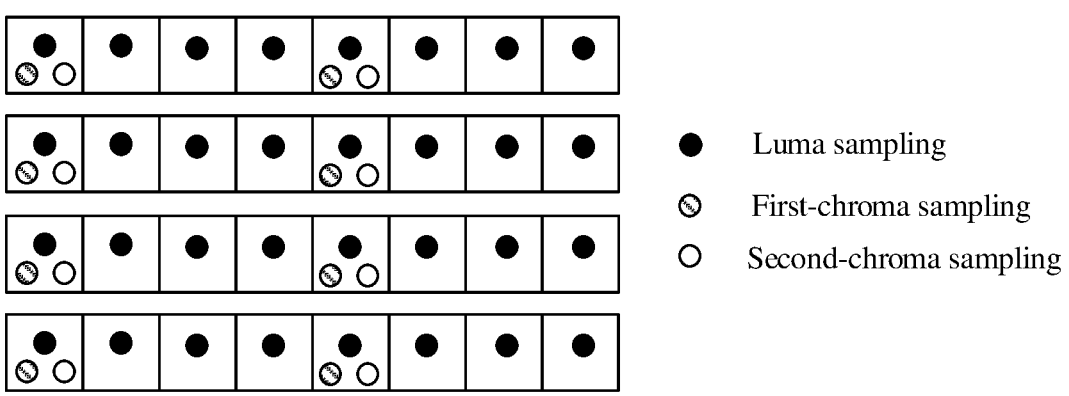
FIG. 3 is a schematic diagram of a 4:1:1 sampling format.

As shown in FIG. 3, luma sampling is performed on each sample, and chroma sampling is performed once on every four samples in a horizontal direction. That is, on every four samples, luma sampling is performed four times, first-chroma sampling is performed once, and second-chroma sampling is performed once. This sampling format is referred to as 4:1:1. In FIG. 3, a sampling ratio of first chroma or second chroma is a quarter of a luma sampling ratio.

Figure 4:
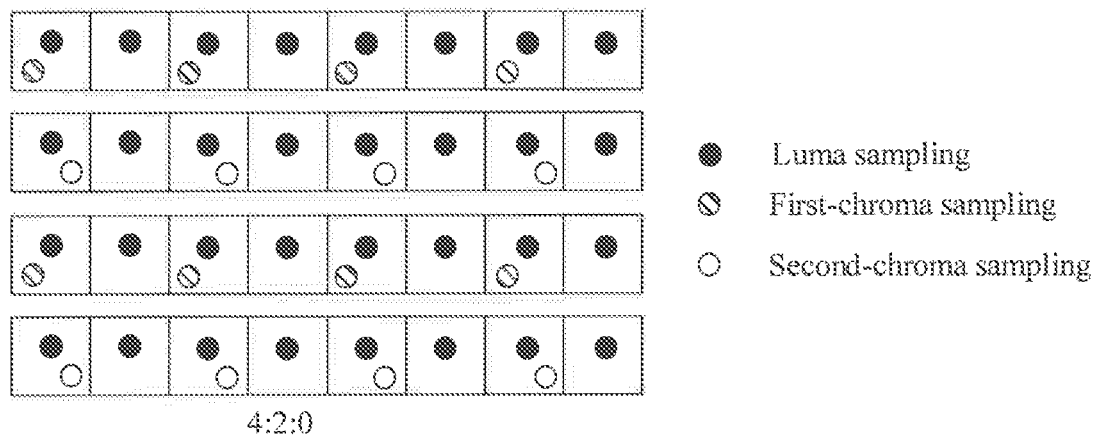
FIG. 4 is a schematic diagram of a 4:2:0 sampling format.

As shown in FIG. 4, luma sampling is performed on each sample, first-chroma sampling is performed once on every two of samples in a first row, and second-chroma sampling is performed once on every two of samples in a second row. This sampling format is referred to as 4:2:0. First chroma and second chroma are separately sampled in FIG. 4, while first chroma and second chroma are sampled together in FIG. 1 to FIG. 3. That is, in FIG. 1 to FIG. 3, if chroma sampling needs to be performed on a sample, first-chroma sampling and second-chroma sampling need to be performed, while in FIG. 4, if chroma sampling needs to be performed on a sample, first-chroma sampling or second-chroma sampling may be selected.

It should be understood that in the embodiments of this application, a sampling format of samples of a to-be-processed image may be any one of the sampling formats in FIG. 1 to FIG. 4.

In ALF, a luma sample and a chroma sample are separately processed when filtering processing is performed on samples of an image. Luma samples are classified into N types based on a relationship between a current luma sample and a neighboring luma sample. A same adaptive filter is used (that is, a same group of filter coefficients is used) for a same type of luma sample, and a same adaptive filter or different adaptive filters may be used for different types of luma samples. However, conventionally, chroma samples are not classified based on a relationship between a current chroma sample and a neighboring chroma sample, and another adaptive filter is used (that is, another group of filter coefficients is used) to perform filtering processing on chroma samples of an entire image.

Because a luma sample and a chroma sample are separately filtered using corresponding filters, both a filter coefficient of the chroma sample and a filter coefficient of the luma sample need to be transmitted. Consequently, bit rate overheads for transmission increase.

Therefore, the embodiments of this application provide an image filtering method, to determine a filter coefficient of a chroma sample based on a filter coefficient of a luma sample. Therefore, only the filter coefficient of the luma sample needs to be transmitted, and the filter coefficient of the chroma sample may be determined based on the filter coefficient of the luma sample such that bit rate overheads for transmission can be reduced.

Figure 5:
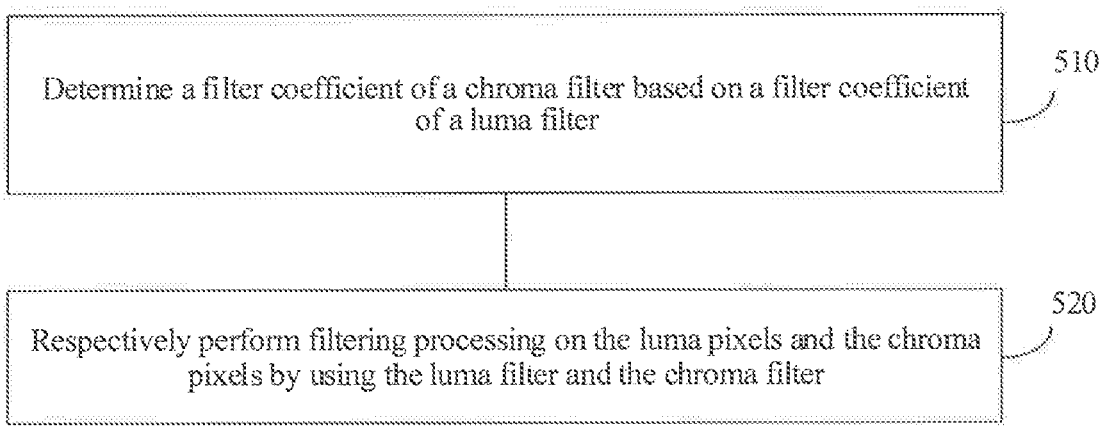
FIG. 5 is a schematic flowchart of an image filtering method according to an embodiment of this application.

FIG. 5 is a schematic flowchart of an ALF method according to an embodiment of this application. The method in FIG. 5 includes the following steps.

Step 510. Determine a filter coefficient of a chroma filter based on a filter coefficient of a luma filter.

The luma filter is applied to perform filtering processing on luma samples of a to-be-processed image.

All filter coefficients of the luma filter present a first geometric distribution, all filter coefficients of the chroma filter present a second geometric distribution, the first geometric distribution and the second geometric distribution are similar shapes, and a filter coefficient of the chroma filter at an edge of the second geometric distribution is calculated using one or more filter coefficients of the luma filter at an edge of the first geometric distribution. For example, a filter type of each of the luma filter and the chroma filter may be any one of a tap filter with 9×9 diamond shape, a tap filter with 7×7 diamond shape, and a tap filter with 5×5 diamond shape shown in FIG. 6 to FIG. 10. It should be understood that a distribution of the tap filter with 9×9 diamond shape, a distribution of the tap filter with 7×7 diamond shape, and a distribution of the tap filter with 5×5 diamond shape are geometrically similar shapes. Certainly, each of the chroma filter and the luma filter may be another type of filter. For example, the luma filter may be a filter with a filter coefficient distribution shown in FIG. 17.

In addition, chroma samples may include a first chroma sample (Cb) and a second chroma sample (Cr). The filter coefficient that is determined based on the filter coefficient of the luma filter and that is of the chroma filter used to perform filtering processing on the chroma samples may be a filter coefficient of a chroma filter that is determined based on the filter coefficient of the luma filter and that is of a chroma filter used to perform filtering processing on the first chroma sample and/or the second chroma sample.

In this case, a same chroma filter may be used to perform filtering processing on a first chroma sample and a second chroma sample at a same sampling location.

Step 520. Respectively perform filtering processing on the luma samples and the chroma samples using the luma filter and the chroma filter.

In this application, a filter coefficient of a chroma sample can be determined based on a filter coefficient of a luma sample. Therefore, only the filter coefficient of the luma sample needs to be transmitted, and the filter coefficient of the chroma sample may be determined based on the filter coefficient of the luma sample such that bit rate overheads for transmission can be reduced.

Further, when the method in FIG. 5 is performed by an encoder, the encoder may determine the filter coefficient of the chroma sample based on the filter coefficient of the luma sample, and encode only the filter coefficient of the luma sample, without encoding the filter coefficient of the chroma sample such that bitstreams can be reduced, and encoding and decoding efficiency can be improved.

When the method in FIG. 5 is performed by a decoder, the decoder may obtain the filter coefficient of the luma filter based on a bitstream, and then determine the filter coefficient of the chroma filter based on the filter coefficient of the luma filter.

Optionally, determining a filter coefficient of a chroma filter based on a filter coefficient of a luma filter includes determining a third-type filter coefficient of the chroma filter based on a first-type filter coefficient of the luma filter, and determining a fourth-type filter coefficient of the chroma filter based on a second-type filter coefficient of the luma filter.

The fourth-type filter coefficient is a filter coefficient of the chroma filter at the edge of the second geometric distribution, the third-type filter coefficient is a filter coefficient of the chroma filter other than the fourth-type filter coefficient, the first-type filter coefficient is a filter coefficient at a same location relative to a geometric center in the first geometric distribution as the third-type filter coefficient relative to a geometric center in the second geometric distribution, and the second-type filter coefficient is a filter coefficient of the luma filter other than the first-type filter coefficient.

That is, a center filter coefficient of the chroma filter, namely, a filter coefficient at a location of the geometric center in the second geometric distribution, may be determined based on a center filter coefficient of the luma filter, and the filter coefficient of the chroma filter at the edge of the second geometric distribution may be determined based on the filter coefficient of the luma filter relatively at the edge of the first geometric distribution. It should be understood that the center filter coefficient of the chroma filter may be determined based on the center filter coefficient of the luma filter in at least two implementations. In one implementation, a center represents a single point at a central location, and a filter coefficient of the chroma filter at a central location may be determined based on a filter coefficient of the luma filter at a central location. In the other implementation, a center is a non-peripheral location relative to an edge, namely, several points around a single point at a central location that fall within a specific range, and a center filter coefficient of the chroma filter may be determined based on weighted values of several center filter coefficients of the luma filter.

Figure 6:
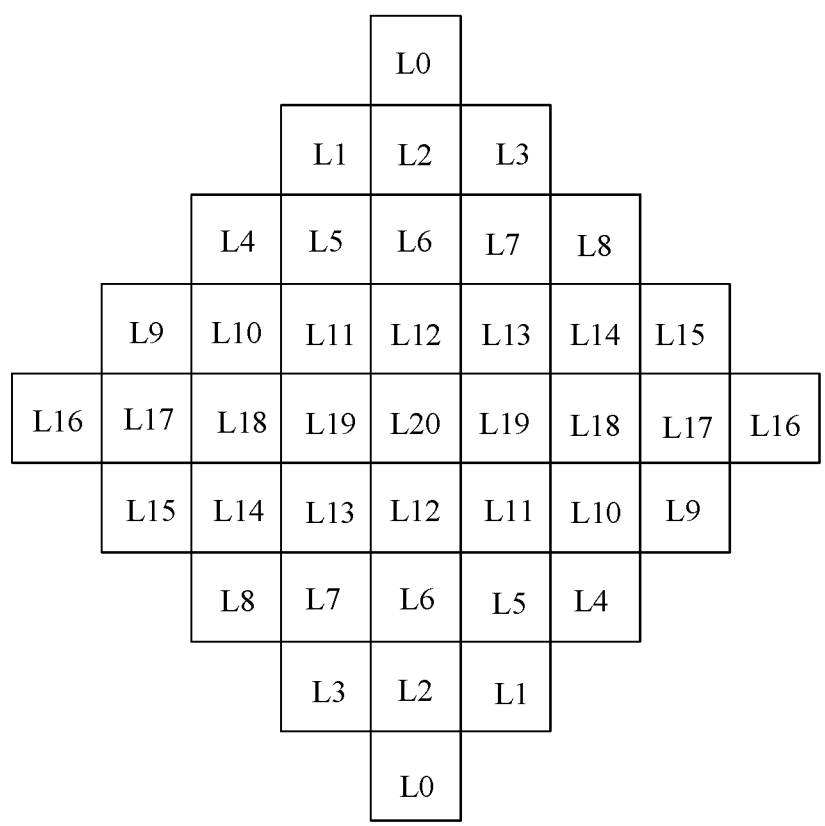
FIG. 6 is a schematic diagram of a tap filter with 9×9 diamond shape.

Further, for example, for a tap filter with 9×9 diamond shape, as shown in FIG. 6, a point L20 is a filter coefficient at a geometric central location that is also referred to as a center filter coefficient in this specification. L0, L1, L2, L3, L4, L8, and the like are filter coefficients relatively at an edge of a geometric distribution that are also referred to as peripheral filter coefficients in this specification. It should be understood that L2 is not located at the edge of the geometric distribution, but is more approximate to the edge than the center filter coefficient, and therefore is referred to as a filter coefficient relatively at the edge of the geometric distribution.

Further, determining a third-type filter coefficient of the chroma filter based on a first-type filter coefficient of the luma filter may include assigning a value of a first luma filter coefficient in the first-type filter coefficient to a first chroma filter coefficient in the third-type filter coefficient, where a location of the first chroma filter coefficient relative to the geometric center in the second geometric distribution is the same as a location of the first luma filter coefficient relative to the geometric center in the first geometric distribution, that is, using any luma filter coefficient in the first-type filter coefficient as a chroma filter coefficient in the third-type filter coefficient, where a location of the chroma filter coefficient relative to the center filter coefficient of the chroma filter is the same as a location of the luma filter coefficient relative to the center filter coefficient of the luma filter.

Because the luma sample and the chroma sample respectively processed using the luma filter and the chroma filter are located at a same sampling location, a relatively desirable filtering effect can be achieved by performing filtering processing on the chroma sample using the chroma filter determined based on the luma filter.

Optionally, in an embodiment, determining a fourth-type filter coefficient of the chroma filter based on a second-type filter coefficient of the luma filter includes using a sum of a value of a second luma filter coefficient in the second-type filter coefficient and a value of at least one third luma filter coefficient that has a neighborhood relationship with the second luma filter coefficient, as a value of a second chroma filter coefficient in the fourth-type filter coefficient, where a location of the second chroma filter coefficient relative to the geometric center in the second geometric distribution is the same as a location of the second luma filter coefficient relative to the geometric center in the first geometric distribution, that is, using, as a fourth filter coefficient in the fourth-type filter coefficient, a sum of any third-type filter coefficient in the second-type filter coefficient and a filter coefficient adjacent to the third-type filter coefficient, where a location of the fourth filter coefficient relative to the center filter coefficient of the chroma filter is the same as a location of the third-type filter coefficient relative to the center filter coefficient of the luma filter.

It should be understood that the at least one third luma filter coefficient that has a neighborhood relationship with the second luma filter coefficient includes a second-type filter coefficient adjacent to or spaced by K (K is an integer greater than or equal to 1) from the second luma filter coefficient in the first geometric distribution.

The at least one third luma filter coefficient that has a neighborhood relationship with the second luma filter coefficient includes a second-type filter coefficient that is adjacent to or spaced by K from the second luma filter coefficient in the first geometric distribution and that is farther from the geometric center in the first geometric distribution than the second luma filter coefficient, where K is an integer greater than or equal to 1.

That is, the at least one third luma filter coefficient may be a second-type filter coefficient that is in filter coefficients around the second luma filter coefficient and that is farther from the geometric center in the first geometric distribution.

It should be understood that when K=1, it indicates that there is another filter coefficient between two filter coefficients on a two-dimensional plane. For example, in FIG. 6, an interval between L0 and L6 is 1, an interval between L1 and L3 is 1, and an interval between L1 and L13 is 1. In addition, for some filters with a relatively large quantity of taps (for example, 11×11 taps), a value of K may be an integer greater than 1.

The filter coefficient adjacent to the third-type filter coefficient may be a filter coefficient that is adjacent to the third-type filter coefficient and that is located on the periphery of the third-type filter coefficient.

Optionally, in an embodiment, the method in FIG. 5 further includes determining that a quantity of taps of the luma filter is greater than or equal to a preset value.

For example, when the quantity of taps of the luma filter is greater than or equal to 5×5, a chroma filter coefficient may be determined based on a luma filter coefficient according to the method in FIG. 5.

Using specific examples, the following describes in detail how to determine the third-type filter coefficient and the fourth-type filter coefficient of the chroma filter based on the first-type filter coefficient and the second-type filter coefficient of the luma filter.

Example 1

Figure 9:
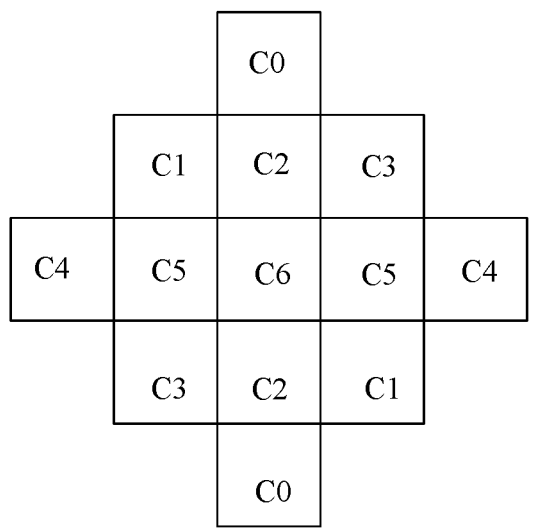
FIG. 9 is a schematic diagram of a tap filter with 5×5 diamond shape.

The luma filter is a tap filter with 9×9 diamond shape (as shown in FIG. 6), and the chroma filter is a tap filter with 5×5 diamond shape (as shown in FIG. 9). In this case, third-type filter coefficients are C6, C2, and C5, fourth-type filter coefficients are C0, C1, C3, and C4, first-type filter coefficients are L20, L12, and L19, and second-type filter coefficients are L0, L1, L2, L3, L4, L5, L6, L7, L8, L9, L10, L11, L13, L14, L15, L16, L17, and L18.

Relative locations of the first-type filter coefficients (L20, L12, and L19) in the first geometric distribution of the luma filter are respectively the same as relative locations of the third-type filter coefficients (C6, C2, and C5) in the second geometric distribution of the chroma filter.

Relative locations, in the luma filter, of L6, L11, L13, and L18 in the second-type filter coefficients are respectively the same as relative locations of the fourth-type filter coefficients C0, C1, C3, and C4 in the chroma filter.

In this case, the following may be obtained:
C6=L20;
C2=L12; and
C5=L19.

The relative locations of C6, C2, and C5 in the chroma filter are the same as the relative locations of L20, L12, and L19 in the luma filter, and a value of a related coefficient of the luma filter may be directly determined as a filter coefficient, at a corresponding location, of the chroma filter.

In addition, the following may be further obtained:

C0=L1+L2+L3+L0+L6;

C1=L4+L5+L10+L11;

C3=L7+L8+L14+L13; and

C4=L9+L15+L16+L17+L18.

That is, a sum of L6 at a same location as C0, and L0, L1, L2, and L3 on the peripheral of L6 is used as C0, a sum of L11 at a same location as C1, and L4, L5, and L10 on the peripheral of L11 is used as C1, a sum of L13 at a same location as C3, and L7, L8, and L14 on the peripheral of L13 is used as C3, and a sum of L18 at a same location as C4, and L9, L15, L16, and L17 on the peripheral of L18 is used as C4.

In another example, C0 to C6 may be calculated in a plurality of other manners. Examples are as follows:

C0=L1+L2+L3+L6, C0=L1+L3+L6, or C0=L6+L2;

C1=L5+L10+L11, or C1=L4+L11;

C2=L12+L16+L20+L11+L13, or C2=L5+L6+L7+ L11+L12+L13+L19+L20+L19;

C3=L13+L7+L14, or C3=L8+L13;

C4=L18+L9+L15+L17, C4=L9+L15+L18, or C4=L17+L18;

C5=L11+L18+L19+L20+L13, or C5=L11+L18+L19+ L20+L13+L10+L12+L14+L12;

and

C6=L19+L20+L19+L12+L12, or

C6=L19+L20+L19+L12+L12+L11+L13+L13+L11.

It should be understood that the plurality of foregoing manners of calculating C0 to C6 and combinations thereof are not limited in different examples.

It should be understood that when the filter coefficients of the chroma filter present another geometric distribution, there are also a plurality of similar calculation manners, and this is not limited.

Example 2

Figure 7:
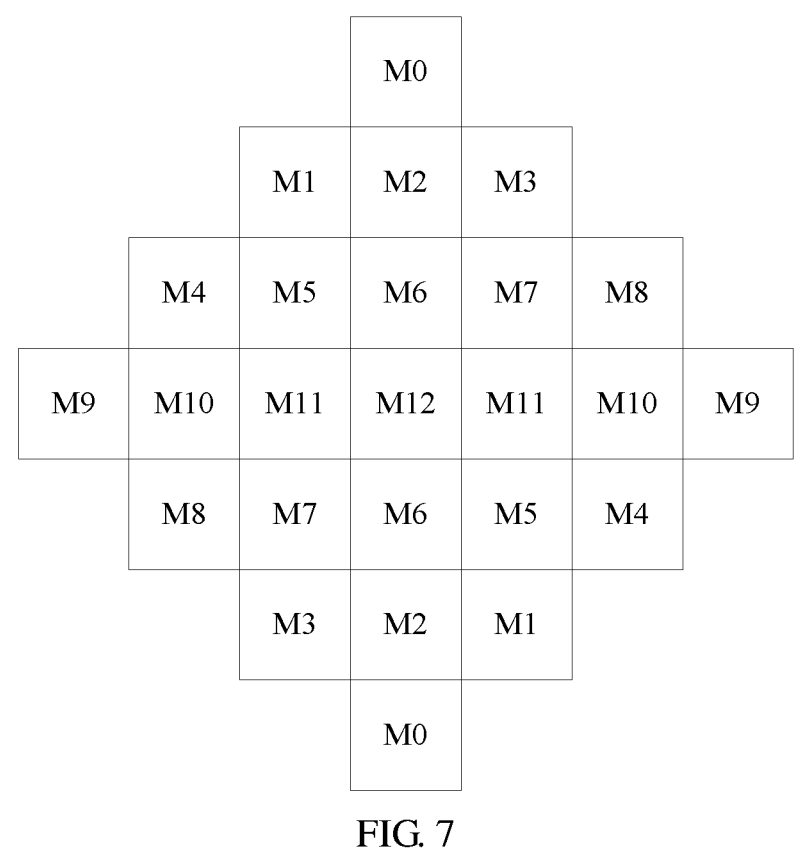

The luma filter is a tap filter with 7×7 diamond shape (as shown in FIG. 7), and the chroma filter is a tap filter with 5×5 diamond shape (as shown in FIG. 9). In this case, third-type filter coefficients are C6, C2, and C5, fourth-type filter coefficients are C0, C1, C3, and C4, first-type filter coefficients are M12, M6, and M11, and second-type filter coefficients are M0, M1, M2, M3, M4, M5, M7, M8, M9, and M10.

Relative locations of the first-type filter coefficients (M12, M6, and M11) in the luma filter are respectively the same as relative locations of the third-type filter coefficients (C6, C2, and C5) in the chroma filter.

Relative locations, in the luma filter, of M2, M5, M7, and M10 in the second-type filter coefficients are respectively the same as relative locations of the fourth-type filter coefficients C0, C1, C3, and C4 in the chroma filter.

In this case, the following may be obtained:

C6=M12;

C2=M6; and

C5=M11.

The relative locations of C6, C2, and C5 in the chroma filter are the same as the relative locations of M12, M6, and M11 in the luma filter, and a value of a related coefficient of the luma filter may be directly determined as a filter coefficient, at a corresponding location, of the chroma filter.

In addition, the following may be further obtained:

$C0=M0+M2$;

$C1=M1+M4+M5$;

$C3=M3+M8+M7$; and $C4=M9+M10$.

That is, a sum of M2 at a same location as C0 and M0 on the periphery of M2 is used as C0, a sum of M5 at a same location as C1, and M1 and M4 on the periphery of M5 is used as C1, a sum of M7 at a same location as C3, and M3 and M8 on the periphery of M7 is used as C3, and a sum of M10 at a same location as C4 and M9 on the periphery of M10 is used as C4.

Example 3

Figure 10:
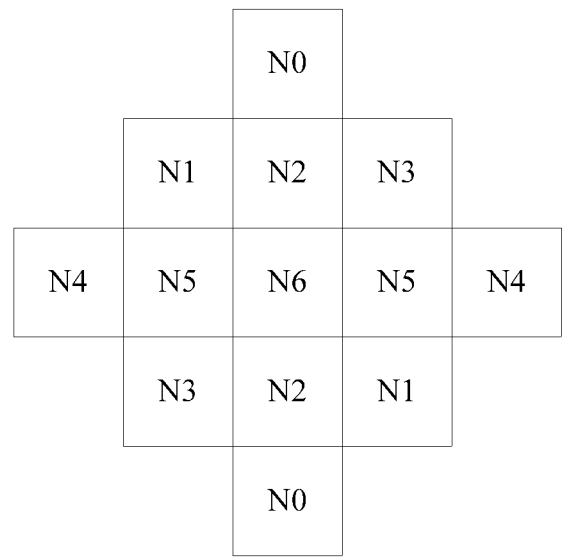
FIG. 10 is a schematic diagram of a tap filter with 5×5 diamond shape.

When the luma filter and the chroma filter each are a tap filter with 5×5 diamond shape, as shown in FIG. 9 and FIG. 10, assuming that a filter shown in FIG. 9 is a luma filter and a filter shown in FIG. 10 is a chroma filter, because the chroma filter and the luma filter are identical in shape, a filter coefficient of the luma filter may be directly determined as a filter coefficient, at a corresponding location, of the chroma filter. That is, filter coefficients C0 to C6 of the luma filter are directly determined as filter coefficients N0 to N6 of the chroma filter respectively.

It should be understood that a tap filter with 5×5 diamond shape is used only as an example herein. When the luma filter and the chroma filter each are another type of filter, a filter coefficient of the luma filter may be directly determined as a filter coefficient, at a corresponding location, of the chroma filter.

Example 4

Figure 17:
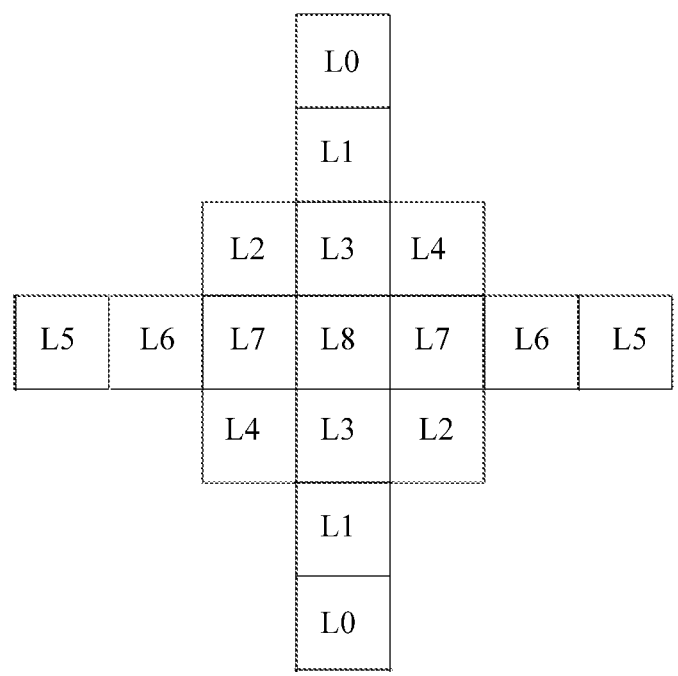
FIG. 17 is a schematic diagram of another filter according to an embodiment of this application.

The luma filter is a filter with a 7×7 cross and 3×3 rectangular taps (as shown in FIG. 17), and the chroma filter is a tap filter with 5×5 diamond shape (as shown in FIG. 10). In this case, third-type filter coefficients are C1, C2, C3, C5, and C6, fourth-type filter coefficients are C0 and C4, first-type filter coefficients are L2, L3, L4, L7, and L8, and second-type filter coefficients are L0, L1, L5, and L6.

Relative locations of the first-type filter coefficients (L2, L3, L4, L7, and L8) in the luma filter are respectively the same as relative locations of the third-type filter coefficients (C1, C2, C3, C5, and C6) in the chroma filter.

Relative locations, in the luma filter, of L1 and L6 in the second-type filter coefficients are respectively the same as relative locations of the fourth-type filter coefficients C0 and C4 in the chroma filter.

In this case, the following may be obtained:

C1=L2;

C2=L3;

C3=L4;

C5=L7; and

C6=L8.

The relative locations of C1, C2, C3, C5, and C6 in the chroma filter are the same as the relative locations of L2, L3, L4, L7, and L8 in the luma filter, and a value of a related coefficient of the luma filter may be directly determined as a filter coefficient, at a corresponding location, of the chroma filter.

In addition, the following may be further obtained:

$C0=L1+L0$; and $C4=L6+L5$.

That is, a sum of L1 at a same location as C0 and L0 on the peripheral of L1 is used as C0, and a sum of L6 at a same location as C4 and L5 on the periphery of L6 is used as C4.

It should be understood that when the filter coefficients of the chroma filter present another geometric distribution, there are also a plurality of similar calculation manners, and this is not limited.

Optionally, in an embodiment, the method in FIG. 5 further includes determining a quantity of taps of the luma filter. Determining a filter coefficient of a chroma filter based on a filter coefficient of a luma filter includes using the filter coefficient of the luma filter as the filter coefficient of the chroma filter when the quantity of taps of the luma filter is less than a preset value.

Further, using the filter coefficient of the luma filter as the filter coefficient of the chroma filter includes using a fourth luma filter coefficient of the luma filter as a fourth chroma filter coefficient of the chroma filter, where a location of the fourth chroma filter coefficient relative to a geometric center in the second geometric distribution is the same as a location of the fourth luma filter coefficient relative to a geometric center in the first geometric distribution, that is, using any one of the filter coefficients (the fourth luma filter coefficient in the luma filter coefficients) of the luma filter as a fourth chroma filter coefficient of the chroma filter, where a location of the fourth chroma filter coefficient relative to the center filter coefficient of the chroma filter is the same as a location of the fourth luma filter coefficient relative to the center filter coefficient of the luma filter.

When the quantity of taps of the luma filter is relatively small, the filter coefficient of the luma filter may be directly used as the filter coefficient of the chroma filter (in this case, a same filter is used to perform filtering processing on the luma samples and the chroma samples), thereby simplifying a process of determining the filter coefficient of the chroma filter.

Figure 8:
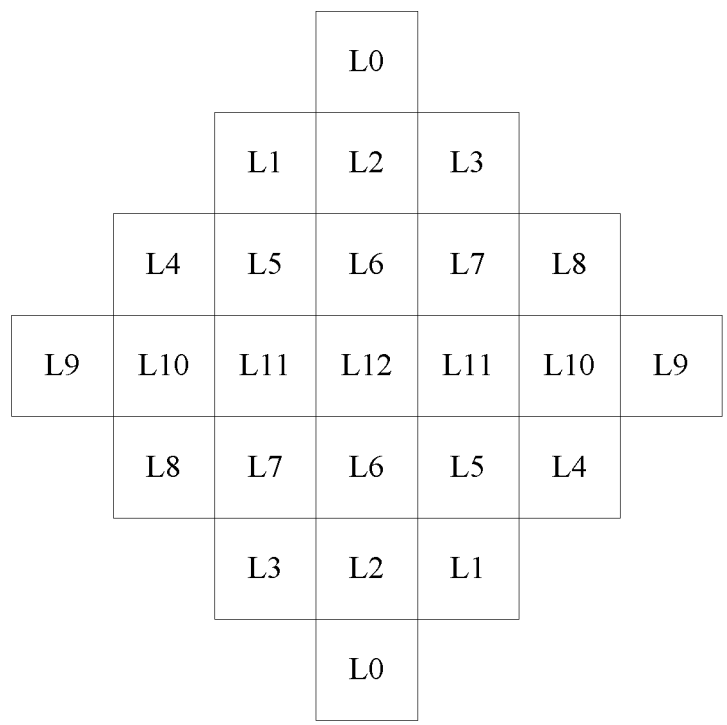
FIG. 8 is a schematic diagram of a tap filter with 7×7 diamond shape.

For example, when the luma filter is a tap filter with 7×7 diamond shape, a quantity of taps of the luma filter is less than a preset value. In this case, the chroma filter is also a tap filter with 7×7 diamond shape. When a filter coefficient of the chroma filter is being determined, a filter coefficient, at a corresponding location, of the luma filter may be directly determined as the filter coefficient of the chroma filter. As shown in FIG. 7 and FIG. 8, assuming that filter coefficients in FIG. 7 are filter coefficients of the luma filter, and filter coefficients in FIG. 8 are filter coefficients of the chroma filter, values of M0 to M12 may be respectively used as values of L0 to L12.

For another example, when the luma filter is a tap filter with 5×5 diamond shape, a quantity of taps of the luma filter is less than a preset value. In this case, the chroma filter is also a tap filter with 5×5 diamond shape. When a filter coefficient of the chroma filter is being determined, a filter coefficient, at a corresponding location, of the luma filter may be directly determined as the filter coefficient of the chroma filter. As shown in FIG. 9 and FIG. 10, assuming that filter coefficients in FIG. 8 are filter coefficients of the luma filter, and filter coefficients in FIG. 9 are filter coefficients of the chroma filter, values of C0 to C6 may be respectively used as values of N0 to N6.

Optionally, in an embodiment, the method in FIG. 5 further includes determining types of the luma samples to obtain a plurality of luma sample types, determining types of the chroma samples to obtain a plurality of chroma sample types, where any one of the plurality of chroma sample types is the same as a luma sample type corresponding to a same sampling location, determining luma filtering identification information of a luma sample, where the luma filtering identification information is used to indicate whether to perform filtering processing on the luma sample, and determining chroma filtering identification information of a chroma sample, where the chroma filtering identification information is used to indicate whether to perform chroma filtering on the chroma sample.

Optionally, in an embodiment, the method in FIG. 5 further includes determining types of the luma samples to obtain a plurality of luma sample types, determining types of the chroma samples to obtain a plurality of chroma sample types, where any one of the plurality of chroma sample types is the same as a luma sample type corresponding to a same sampling location, and determining luma filtering identification information of a luma sample, where the luma filtering identification information is used to instruct to perform filtering processing on the luma sample and a chroma sample at a corresponding sampling location. In this embodiment, the luma filtering identification information is reused for filtering processing on the chroma sample.

Compared with a manner in which whether filtering is to be performed can be chosen only for a chroma sample (Cb or Cr) of an entire image, a chroma sample and a luma sample at a same sampling location are controlled using a same filtering enabling/disabling function such that enabling/disabling control can be implemented on a chroma sample at a finer granularity, thereby flexibly controlling filtering processing on the chroma sample and achieving a better filtering effect.

That is, same control is used for a chroma sample and a luma sample at a same sampling location. If a luma sample is to be filtered, a chroma sample at a same sampling location as the luma sample needs to be filtered. If a luma sample is not to be filtered, a chroma sample at a same sampling location as the luma sample is not to be filtered either.

Figure 11:
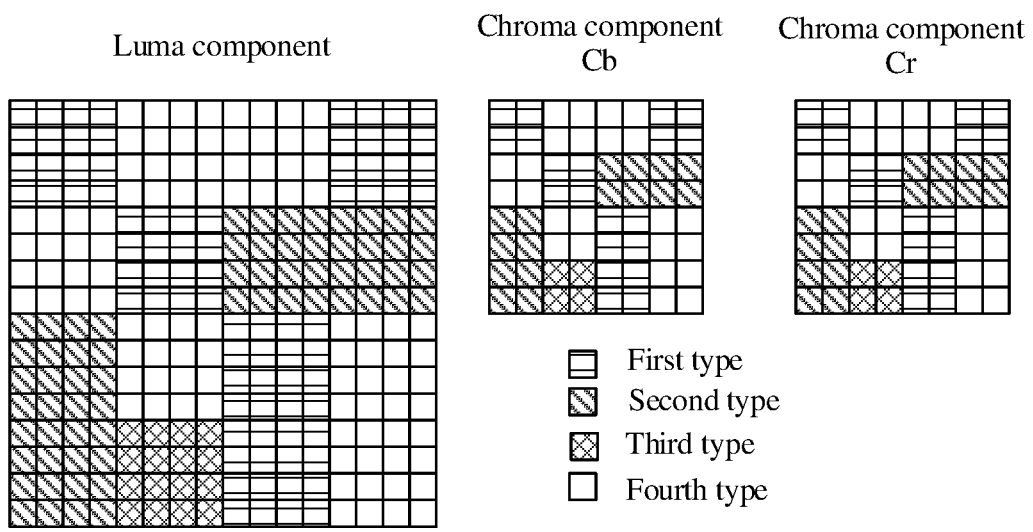
FIG. 11 is a schematic diagram of a classification result obtained after luma samples and chroma samples of an image are classified.

As shown in FIG. 11, after samples of an image are classified into four types of luma samples, luma filtering identification information of a first-type luma sample to a third-type luma sample is "enable", and luma filtering identification information of a fourth-type luma sample is "disable", that is, filtering processing is to be performed on the first-type luma sample to the third-type luma sample, and no filtering processing is to be performed on the fourth-type luma sample. A chroma sample (Cb or Cr), of the image, at a same sampling location as a luma sample is classified into a type with a same type number as that of the luma sample. To be specific, chroma samples, of the image, at same sampling locations as the first-type luma sample to the fourth-type luma sample are classified into a first-type chroma sample to a fourth-type chroma sample. A finally obtained classification result of the chroma samples is shown in FIG. 11. Because filtering processing is to be performed on each of the first-type luma sample to the third-type luma sample, and no filtering processing is to be performed on the fourth-type luma sample, filtering processing is also to be performed on the first-type chroma sample to the third-type chroma sample (Cb or Cr), and no filtering processing is to be performed on the fourth-type chroma sample.

In this embodiment of this application, luma samples of an image may be classified according to $C=5D+\hat{A}$, where C is a final type number of a luma sample, D is texture directivity of an image region corresponding to the luma samples, and $\hat{A}$ is change intensity of the image region corresponding to the luma samples.

The texture directivity D of the image region corresponding to the luma samples may be calculated according to the following steps.

(1) First calculate a gradient $g_h$ in a horizontal direction, a gradient $g_v$ in a vertical direction, and gradients $g_{d1}$ and $g_{d2}$ in two diagonal directions of the image region corresponding to the luma samples:

$$g_h = \sum_{k=i-a}^{i+b} \sum_{l=j-a}^{j+b} H_{k,l},$$

where $H_{k,l}=|2R(k,l)-R(k-1,l)-R(k+1,l)|$;

$$g_v = \sum_{k=i-a}^{i+b} \sum_{l=j-a}^{j+b} V_{k,l},$$

where $V_{k,l}=|2R(k,l)-R(k,l-1)-R(k,l+1)|$;

$$g_{d1} = \sum_{k=i-a}^{i+b} \sum_{l=j-a}^{j+b} D1_{k,l},$$

where $D1_{k,l}=|2R(k,l)-R(k-1,l-1)-R(k+1,l+1)|$; and $$g_{d2} = \sum_{k=i-a}^{i+b} \sum_{l=j-a}^{j+b} D2_{k,l},$$

where $D2_{k,l}=|2R(k,l)-R(k-1,l+1)-R(k+1,l-1)|$, where R(k,l) is coordinates of a pixel at a preset location in the luma samples, k is a horizontal coordinate of the pixel at the preset location, l is a vertical coordinate of the pixel at the preset location R(k−1,l), R(k+1,l), R(k,l−1), R(k,l+1), R(k−1,l−1), R(k+1,l+1), R(k−1,l+1) and R(k+1,l−1) are eight neighboring pixels of the pixel R(k,l) at the preset location, all of i, j, a, and b are integers, i−a≤k≤i+b, and j−a≤l≤j+b.

(2) Calculate a maximum value $g_{h,v}^{max}$ and a minimum value $g_{h,v}^{min}$ in the gradients in the horizontal direction and the vertical direction:

$g_{h,v}^{max}=\max(g_h,g_v)$, and $g_{h,v}^{min}=\min(g_h,g_v)$, (3) Calculate a maximum value $g_{d0,d1}^{max}$ and a minimum value $g_{d0,d1}^{min}$ in the gradients in the two diagonal directions:

$$g_{d0,d1}{}^{max}=\max(g_{d0},g_{d1}), \text{ and}$$

$$g_{d0,d1}{}^{min}=\min(g_{d0},g_{d1}),$$

(4) Determine two thresholds t1 and t2, and perform the following comparison for the maximum values and the minimum values in the gradients to determine the directivity D:

1. if $g_{h,v}{}^{max}<=t_1 \cdot g_{h,v}{}^{min}$ and $g_{d0,d1}{}^{max}<=t_1 \cdot g_{d0,d1}{}^{min}$, D=0;

2. if $g_{h,v}{}^{max}/g_{h,v}{}^{min}>g_{d0,d1}{}^{max}/g_{d0,d1}{}^{min}$, perform step (3); otherwise, perform step (4);

3. if $g_{h,v}{}^{max} \times t_2 \cdot g_{h,v}{}^{max}$, D=2; otherwise, D=1; and 4. if $g_{d0,d1}{}^{max} t_2 \cdot g_{d0,d1}{}^{min}$, D=4; otherwise, D=3.

The change intensity Â of the image region corresponding to the luma samples may be calculated in the following manner.

(1) Calculate change intensity A of the image region corresponding to the luma samples:

$$A = \sum_{k=i-2}^{i+3} \sum_{l=j-2}^{j+3} (V_{k,l} + H_{k,l}).$$

(2) Further quantize A into an integer in [0, 4], where a quantized value is denoted as Â.

Therefore, the luma samples of the image may be classified according to C=5D+Â, and the luma samples of the image may be classified into 25 types according to the formula. Therefore, there may be 25 groups of corresponding adaptive filter coefficients.

Optionally, in an embodiment, when the method in FIG. 5 is applied to the decoder, before determining a filter coefficient of a chroma filter based on a filter coefficient of a luma filter, the method in FIG. 5 further includes parsing a bitstream to obtain the filter coefficient of the luma filter.

It should be understood that the decoder herein determines the filter coefficient of the chroma filter using the filter coefficient of the luma filter, instead of obtaining the filter coefficient of the chroma filter using a bitstream.

Optionally, in an embodiment, when the method in FIG. 5 is applied to the encoder, the method in FIG. 5 further includes encoding the filter coefficient of the luma filter.

During encoding, the encoder only needs to encode the filter coefficient of the luma filter, and does not need to encode the filter coefficient of the chroma filter, thereby reducing bitstreams that need to be transmitted.

The foregoing describes the image filtering method in the embodiments of this application in detail with reference to FIG. 1 to FIG. 11. The following describes image filtering apparatuses in the embodiments of this application in detail with reference to FIG. 12 and FIG. 13. It should be understood that the image filtering apparatuses in FIG. 12 and FIG. 13 can implement the steps of the image filtering method described above. For brevity, repeated descriptions are appropriately omitted below.

In a specific implementation, the image filtering method includes determining a filter coefficient of a chroma filter based on a filter coefficient of a luma filter, where the luma filter and the chroma filter are respectively applied to perform filtering processing on luma samples and chroma samples of a to-be-processed image, a filter coefficient distribution of the luma filter is shown in FIG. 6, and a filter coefficient distribution of the chroma filter is shown in FIG. 9, and respectively performing filtering processing on the luma samples and the chroma samples using the luma filter and the chroma filter, where a relationship between filter coefficients of the luma filter and filter coefficients of the chroma filter is as follows: C6=L20, C2=L12, C5=L19, C0=11×L1+12×L2+13×L3+10×L0+16×L6, C1=14×L4+15×L5+110×L10+111×L11, C3=17×L7+18×L8+113×L13+114×L14, and C4=19×L9+115×L15+116×L16+117×L17+118×L18, where 11, 12, 13, 10, 16, 14, 15, 110, 111, 17, 18, 113, 114, 19, 115, 116, 117, and 118 are weighting coefficients.

In a specific implementation, each of the weighting coefficients 11, 12, 13, 10, 16, 19, 115, 116, 117, and 118 is 1.

In a specific implementation, each of the weighting coefficients 14, 15, 110, 111, 17, 18, 113, and 114 is 1.

In another specific implementation, the image filtering method includes determining a filter coefficient of a chroma filter based on a filter coefficient of a luma filter, where the luma filter and the chroma filter are respectively applied to perform filtering processing on luma samples and chroma samples of a to-be-processed image, a filter coefficient distribution of the luma filter is shown in FIG. 17, and a filter coefficient distribution of the chroma filter is shown in FIG. 9, and respectively performing filtering processing on the luma samples and the chroma samples using the luma filter and the chroma filter, where a relationship between filter coefficients of the luma filter and filter coefficients of the chroma filter is as follows: C6=L8, C5=L7, C2=L3, C1=L2, C3=L4, C0=c0×L0+c1×L1, and C4=c5×L5+c6×L6, where c0, c1, c5, and c6 are weighting coefficients.

It should be understood that in this embodiment, all the filter coefficients of the luma filter present a first geometric distribution, all the filter coefficients of the chroma filter present a second geometric distribution, and the first geometric distribution and the second geometric distribution are similar shapes, but are not similar images. However, it remains unchanged that a filter coefficient of the chroma filter at an edge of the second geometric distribution is calculated using one or more filter coefficients of the luma filter at an edge of the first geometric distribution. It should be understood that in this specific implementation, the relationship between the filter coefficients of the luma filter and the filter coefficients of the chroma filter is determined based on the foregoing characteristics, but is not limited to the correspondence provided in this implementation.

In another specific implementation, each of the weighting coefficients c0, c1, c5, and c6 is 1.

Figure 12:
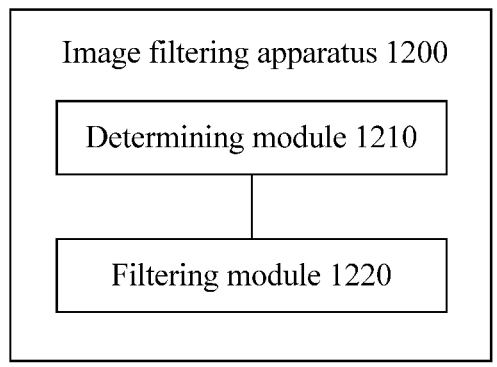
FIG. 12 is a schematic block diagram of an image filtering apparatus according to an embodiment of this application.

FIG. 12 is a schematic block diagram of an image filtering apparatus 1200 according to an embodiment of this application. The image filtering apparatus 1200 in FIG. 12 may perform the image filtering method in FIG. 5, and the image filtering apparatus 1200 includes a determining module 1210 configured to determine a filter coefficient of a chroma filter based on a filter coefficient of a luma filter, where the luma filter and the chroma filter are respectively applied to perform filtering processing on luma samples and chroma samples of a to-be-processed image, all filter coefficients of the luma filter present a first geometric distribution, all filter coefficients of the chroma filter present a second geometric distribution, the first geometric distribution and the second geometric distribution are similar shapes, and a filter coefficient of the chroma filter at an edge of the second geometric distribution is calculated using one or more filter coefficients of the luma filter at an edge of the first geometric distribution, and a filtering module 1220 configured to respectively perform filtering processing on the luma samples and the chroma samples using the luma filter and the chroma filter.

In this application, the filter coefficient of the chroma filter may be determined based on the filter coefficient of the luma filter such that during bitstream transmission, only a bitstream corresponding to the filter coefficient of the luma filter needs to be transmitted, thereby reducing to-be-transmitted bitstreams.

Optionally, in an embodiment, the determining module 1210 is further configured to determine a third-type filter coefficient of the chroma filter based on a first-type filter coefficient of the luma filter, and determine a fourth-type filter coefficient of the chroma filter based on a second-type filter coefficient of the luma filter, where the fourth-type filter coefficient is a filter coefficient of the chroma filter at the edge of the second geometric distribution, the third-type filter coefficient is a filter coefficient of the chroma filter other than the fourth-type filter coefficient, the first-type filter coefficient is a filter coefficient at a same location relative to a geometric center in the first geometric distribution as the third-type filter coefficient relative to a geometric center in the second geometric distribution, and the second-type filter coefficient is a filter coefficient of the luma filter other than the first-type filter coefficient.

Optionally, in an embodiment, the determining module 1210 is further configured to assign a value of a first luma filter coefficient in the first-type filter coefficient to a first chroma filter coefficient in the third-type filter coefficient, where a location of the first chroma filter coefficient relative to the geometric center in the second geometric distribution is the same as a location of the first luma filter coefficient relative to the geometric center in the first geometric distribution.

Optionally, in an embodiment, the luma filter is a tap filter with 9×9 diamond shape, the chroma filter is a tap filter with 5×5 diamond shape, the first geometric distribution is a 9×9 diamond distribution, the second geometric distribution is a 5×5 diamond distribution, the first-type filter coefficient includes L20, L12, and L19, and the third-type filter coefficient includes C6, C2, and C5, where the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a raster scanning order, the filter coefficients of the chroma filter are C0, C1, C2, C3, C4, C5, C6, C5, C4, C3, C2, C1, and C0 in the 5×5 diamond distribution based on a raster scanning order, and a location of L19 relative to L20 is the same as a location of C5 relative to C6. The determining module 1210 is further configured to respectively use L20, L12, and L19 as C6, C2, and C5.

Optionally, in an embodiment, the determining module 1210 is further configured to use a sum of a value of a second luma filter coefficient in the second-type filter coefficient and a value of at least one third luma filter coefficient that has a neighborhood relationship with the second luma filter coefficient, as a value of a second chroma filter coefficient in the fourth-type filter coefficient, where a location of the second chroma filter coefficient relative to the geometric center in the second geometric distribution is the same as a location of the second luma filter coefficient relative to the geometric center in the first geometric distribution.

Optionally, in an embodiment, the at least one third luma filter coefficient that has a neighborhood relationship with the second luma filter coefficient includes a second-type filter coefficient adjacent to or spaced by K from the second luma filter coefficient in the first geometric distribution, where K is an integer greater than or equal to 1.

Optionally, in an embodiment, the luma filter is a tap filter with 9×9 diamond shape, the chroma filter is a tap filter with 5×5 diamond shape, the first geometric distribution is a 9×9 diamond distribution, the second geometric distribution is a 5×5 diamond distribution, the second-type filter coefficient includes L0, L1, L2, L3, L4, L5, L6, L7, L8, L9, L10, L11, L13, L14, L15, L16, L17, and L18, and the fourth-type filter coefficient includes C0, C1, C3, and C4, where the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a raster scanning order, and the filter coefficients of the chroma filter are C0, C1, C2, C3, C4, C5, C6, C5, C4, C3, C2, C1, and C0 in the 5×5 diamond distribution based on a raster scanning order. The determining module 1210 is further configured to use a sum of L1, L2, L3, L0, and L6 as C0, use a sum of L4, L5, L10, and L11 as C1, use a sum of L7, L8, L13, and L14 as C3, and use a sum of L9, L15, L16, L17, and L18 as C4.

Optionally, in an embodiment, the determining module 1210 is further configured to determine that a quantity of taps of the luma filter is greater than or equal to a preset value.

Optionally, in an embodiment, the determining module 1210 is further configured to determine a quantity of taps of the luma filter, and use the filter coefficient of the luma filter as the filter coefficient of the chroma filter when the quantity of taps of the luma filter is less than a preset value.

Optionally, in an embodiment, the determining module 1210 is further configured to use a fourth luma filter coefficient of the luma filter as a fourth chroma filter coefficient of the chroma filter, where a location of the fourth chroma filter coefficient relative to a geometric center in the second geometric distribution is the same as a location of the fourth luma filter coefficient relative to a geometric center in the first geometric distribution.

Optionally, in an embodiment, the image filtering apparatus 1200 further includes a classification module 1230 configured to determine types of the luma samples to obtain a plurality of luma sample types, where the classification module 1230 is further configured to determine types of the chroma samples to obtain a plurality of chroma sample types, where any one of the plurality of chroma sample types is the same as a luma sample type corresponding to a same sampling location, and the determining module 1210 is further configured to determine luma filtering identification information of a luma sample, where the luma filtering identification information is used to instruct to perform filtering processing on the luma sample and a chroma sample at a corresponding sampling location.

Optionally, in an embodiment, the image filtering apparatus 1200 is applied to a decoder, and the image filtering apparatus 1200 further includes a decoding module 1240 configured to parse a bitstream to obtain the filter coefficient of the luma filter.

Optionally, in an embodiment, the image filtering apparatus 1200 is applied to an encoder, and the image filtering apparatus 1200 further includes an encoding module 1250 configured to encode the filter coefficient of the luma filter.

Figure 13:
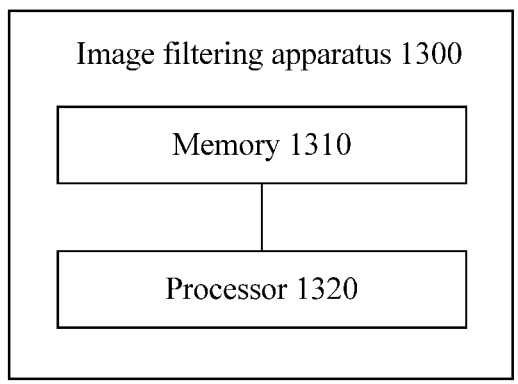
FIG. 13 is a schematic block diagram of an image filtering apparatus according to an embodiment of this application.

FIG. 13 is a schematic block diagram of an image filtering apparatus according to an embodiment of this application. The image filtering apparatus 1300 in FIG. 13 may perform the image filtering method in FIG. 5, and the image filtering apparatus 1300 includes a memory 1310 configured to store a program, and a processor 1320 configured to execute the program stored in the memory 1310. When executing the program, the processor 1320 is configured to determine a filter coefficient of a chroma filter based on a filter coefficient of a luma filter, where the luma filter and the chroma filter are respectively applied to perform filtering processing on luma samples and chroma samples of a to-be-processed image, all filter coefficients of the luma filter present a first geometric distribution, all filter coefficients of the chroma filter present a second geometric distribution, the first geometric distribution and the second geometric distribution are similar shapes, and a filter coefficient of the chroma filter at an edge of the second geometric distribution is calculated using one or more filter coefficients of the luma filter at an edge of the first geometric distribution, and respectively perform filtering processing on the luma samples and the chroma samples using the luma filter and the chroma filter.

In this application, the filter coefficient of the chroma filter may be determined based on the filter coefficient of the luma filter such that during bitstream transmission, only a bitstream corresponding to the filter coefficient of the luma filter needs to be transmitted, thereby reducing to-be-transmitted bitstreams.

Optionally, in an embodiment, the processor 1320 is further configured to determine a third-type filter coefficient of the chroma filter based on a first-type filter coefficient of the luma filter, and determine a fourth-type filter coefficient of the chroma filter based on a second-type filter coefficient of the luma filter, where the fourth-type filter coefficient is a filter coefficient of the chroma filter at the edge of the second geometric distribution, the third-type filter coefficient is a filter coefficient of the chroma filter other than the fourth-type filter coefficient, the first-type filter coefficient is a filter coefficient at a same location relative to a geometric center in the first geometric distribution as the third-type filter coefficient relative to a geometric center in the second geometric distribution, and the second-type filter coefficient is a filter coefficient of the luma filter other than the first-type filter coefficient.

Optionally, in an embodiment, the processor 1320 is further configured to assign a value of a first luma filter coefficient in the first-type filter coefficient to a first chroma filter coefficient in the third-type filter coefficient, where a location of the first chroma filter coefficient relative to the geometric center in the second geometric distribution is the same as a location of the first luma filter coefficient relative to the geometric center in the first geometric distribution.

Optionally, in an embodiment, the luma filter is a tap filter with 9×9 diamond shape, the chroma filter is a tap filter with 5×5 diamond shape, the first geometric distribution is a 9×9 diamond distribution, the second geometric distribution is a 5×5 diamond distribution, the first-type filter coefficient includes L20, L12, and L19, and the third-type filter coefficient includes C6, C2, and C5, where the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a raster scanning order, and the filter coefficients of the chroma filter are C0, C1, C2, C3, C4, C5, C6, C5, C4, C3, C2, C1, and C0 in the 5×5 diamond distribution based on a raster scanning order. The processor 1320 is further configured to respectively use L20, L12, and L19 as C6, C2, and C5.

Optionally, in an embodiment, the processor 1320 is further configured to use a sum of a value of a second luma filter coefficient in the second-type filter coefficient and a value of at least one third luma filter coefficient that has a neighborhood relationship with the second luma filter coefficient, as a value of a second chroma filter coefficient in the fourth-type filter coefficient, where a location of the second chroma filter coefficient relative to the geometric center in the second geometric distribution is the same as a location of the second luma filter coefficient relative to the geometric center in the first geometric distribution.

Optionally, in an embodiment, the at least one third luma filter coefficient that has a neighborhood relationship with the second luma filter coefficient includes a second-type filter coefficient adjacent to or spaced by K from the second luma filter coefficient in the first geometric distribution, where K is an integer greater than or equal to 1.

Optionally, in an embodiment, the luma filter is a tap filter with 9×9 diamond shape, the chroma filter is a tap filter with 5×5 diamond shape, the first geometric distribution is a 9×9 diamond distribution, the second geometric distribution is a 5×5 diamond distribution, the second-type filter coefficient includes L0, L1, L2, L3, L4, L5, L6, L7, L8, L9, L10, L11, L13, L14, L15, L16, L17, and L18, and the fourth-type filter coefficient includes C0, C1, C3, and C4, where the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a raster scanning order, and the filter coefficients of the chroma filter are C0, C1, C2, C3, C4, C5, C6, C5, C4, C3, C2, C1, and C0 in the 5×5 diamond distribution based on a raster scanning order. The processor 1320 is further configured to use a sum of L1, L2, L3, L0, and L6 as C0, use a sum of L4, L5, L10, and L11 as C1, use a sum of L7, L8, L13, and L14 as C3, and use a sum of L9, L15, L16, L17, and L18 as C4.

Optionally, in an embodiment, the processor 1320 is further configured to determine that a quantity of taps of the luma filter is greater than or equal to a preset value.

Optionally, in an embodiment, the processor 1320 is further configured to determine a quantity of taps of the luma filter, and use the filter coefficient of the luma filter as the filter coefficient of the chroma filter when the quantity of taps of the luma filter is less than a preset value.

Optionally, in an embodiment, the processor 1320 is further configured to use a fourth luma filter coefficient of the luma filter as a fourth chroma filter coefficient of the chroma filter, where a location of the fourth chroma filter coefficient relative to a geometric center in the second geometric distribution is the same as a location of the fourth luma filter coefficient relative to a geometric center in the first geometric distribution.

Optionally, in an embodiment, the processor 1320 is further configured to determine types of the luma samples to obtain a plurality of luma sample types, determine types of the chroma samples to obtain a plurality of chroma sample types, where any one of the plurality of chroma sample types is the same as a luma sample type corresponding to a same sampling location, and determine luma filtering identification information of a luma sample, where the luma filtering identification information is used to instruct to perform filtering processing on the luma sample and a chroma sample at a corresponding sampling location.

Optionally, in an embodiment, the image filtering apparatus 1300 is applied to a decoder, and the processor 1320 is further configured to parse a bitstream to obtain the filter coefficient of the luma filter.

Optionally, in an embodiment, the image filtering apparatus 1300 is applied to an encoder, and the processor 1320 is further configured to encode the filter coefficient of the luma filter.

It should be understood that the image filtering apparatus 1200 and the image filtering apparatus 1300 may be further located in an encoding and decoding device or a codec, and the encoding and decoding device or the codec may also perform the image filtering method described above.

Figure 14:
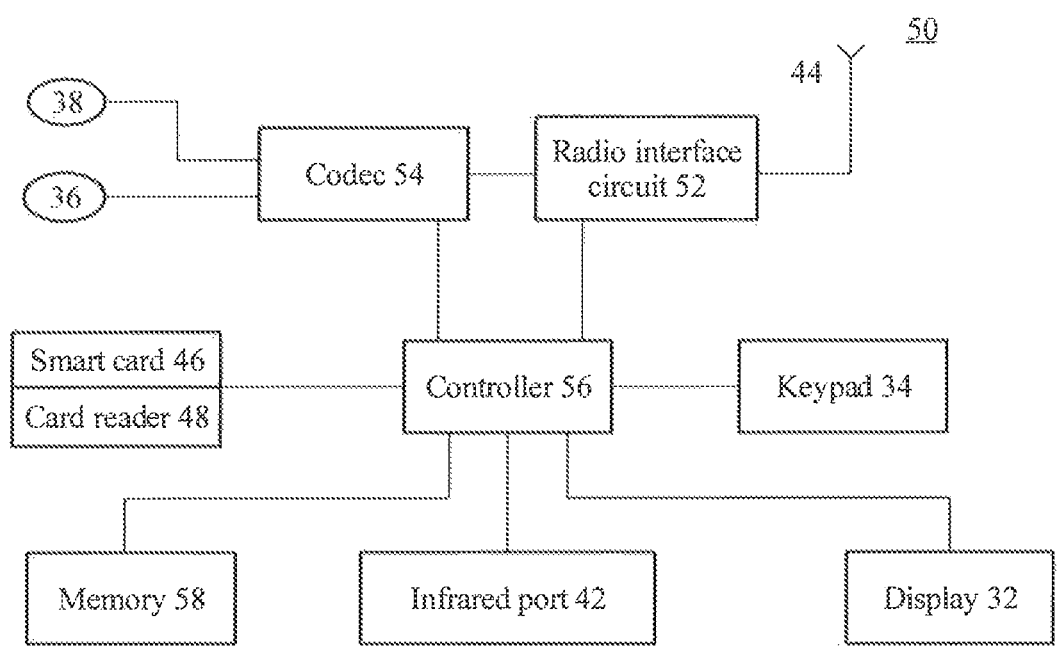
FIG. 14 is a schematic block diagram of an encoding and decoding apparatus according to an embodiment of this application.
Figure 15:
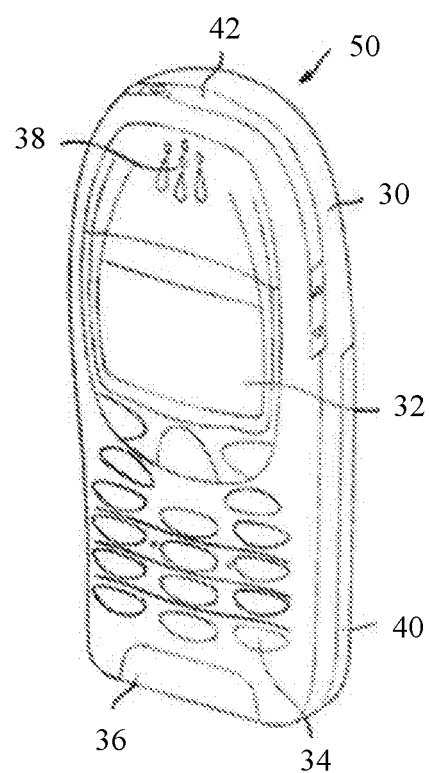
FIG. 15 is a schematic diagram of an encoding and decoding apparatus according to an embodiment of this application.
Figure 16:
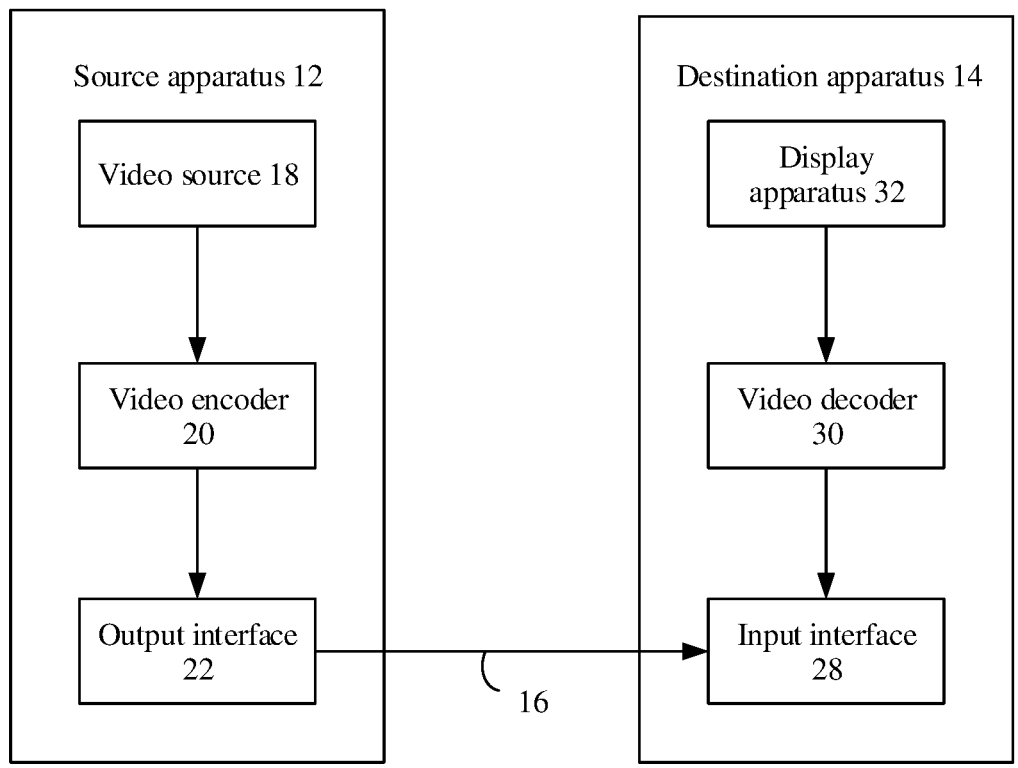
FIG. 16 is a schematic block diagram of a video encoding and decoding system according to an embodiment of this application.

With reference to FIG. 14 to FIG. 16, the following describes in detail an encoding and decoding apparatus and an encoding and decoding system including an encoding and decoding apparatus. It should be understood that the encoding and decoding apparatus and the encoding and decoding system in FIG. 14 to FIG. 16 can perform the image filtering method in FIG. 5.

FIG. 14 and FIG. 15 show an encoding and decoding apparatus 50 according to an embodiment of this application. The encoding and decoding apparatus 50 may be a mobile terminal or user equipment in a wireless communications system. It should be understood that this embodiment of this application may be implemented in any electronic device or apparatus that may need to encode and/or decode a video or an image.

The encoding and decoding apparatus 50 may include a housing 30 integrated into the device and protecting the device, a display 32 (which may be a liquid crystal display), and a keypad 34. The encoding and decoding apparatus 50 may include a microphone 36 or any appropriate audio input, and the audio input may be digital or analog signal input. The encoding and decoding apparatus 50 may further include an audio output device. In this embodiment of this application, the audio output device may be any one of a headset 38, a loudspeaker, an analog audio or digital audio output connection. The encoding and decoding apparatus 50 may also include a battery 40. In another embodiment of this application, the device may be powered by any appropriate mobile energy device such as a solar cell, a fuel cell, or a clock generator. The apparatus 50 may further include an infrared port 42 for performing near field communication with another device. In another embodiment, the encoding and decoding apparatus 50 may further include any appropriate near field communication function such as a BLUETOOTH wireless connection or a Universal Serial Bus (USB)/firewire wired connection.

The encoding and decoding apparatus 50 may include a controller 56 or a processor configured to control the encoding and decoding apparatus 50. The controller 56 may be connected to a memory 58. In this embodiment of this application, the memory 58 may store data in a form of an image and data in a form of an audio, and/or may store an instruction to be implemented on the controller 56. The controller 56 may also be connected to a codec 54 adapted to implement encoding and decoding of audio and/or video data or encoding and decoding implemented with assistance of the controller 56.

The encoding and decoding apparatus 50 may further include a card reader 48 and a smart card 46, such as a universal integrated circuit card (UICC) and a UICC reader configured to provide user information and adapted to provide authentication information for attempting to authenticate and authorizing a user on a network.

The encoding and decoding apparatus 50 may further include a radio interface circuit 52, and the radio interface circuit 52 is connected to the controller 56 and is adapted to generate a wireless communication signal, for example, used to communicate with a cellular communications network, a wireless communications system, or a wireless local area network. The encoding and decoding apparatus 50 may further include an antenna 44, and the antenna 44 is connected to the radio interface circuit 52 and is configured to send radio frequency signals generated by the radio interface circuit 52 to (a plurality of) other apparatuses and configured to receive radio frequency signals from the other apparatuses.

In some embodiments of this application, the encoding and decoding apparatus 50 includes a camera that can record or detect a single frame, and the codec 54 or the controller receives and processes the single frame. In some embodiments of this application, the encoding and decoding apparatus 50 may receive to-be-processed video or image data from another device before transmitting and/or storing the to-be-processed video or image data. In some embodiments of this application, the encoding and decoding apparatus 50 may receive an image through a wireless or wired connection for encoding/decoding.

It should be understood that FIG. 15 is only an example diagram of the encoding and decoding apparatus 50 and each software module and each hardware module included in the encoding and decoding apparatus 50, and there are a plurality of different implementations. For example, the keypad 34 may be a touchscreen, and the touchscreen may be a part of the display 32. This is not limited.

FIG. 16 is a schematic block diagram of a video encoding and decoding system 10 according to an embodiment of this application. As shown in FIG. 16, the video encoding and decoding system 10 includes a source apparatus 12 and a destination apparatus 14. The source apparatus 12 generates encoded video data. Therefore, the source apparatus 12 may be referred to as a video encoding apparatus or a video encoding device. The destination apparatus 14 may decode the encoded video data generated by the source apparatus 12. Therefore, the destination apparatus 14 may be referred to as a video decoding apparatus or a video decoding device. The source apparatus 12 and the destination apparatus 14 may be examples of a video encoding and decoding apparatus or a video encoding and decoding device. The source apparatus 12 and the destination apparatus 14 each may include a desktop computer, a mobile computing apparatus, a notebook (for example, a laptop) computer, a tablet computer, a set-top box, a handheld phone such as a smartphone, a television, a camera, a display apparatus, a digital media player, a video game console, an in-vehicle computer, or another similar device.

The destination apparatus 14 may receive the encoded video data from the source apparatus 12 through a channel 16. The channel 16 may include one or more media and/or apparatuses capable of moving the encoded video data from the source apparatus 12 to the destination apparatus 14. For example, the channel 16 may include one or more communications media that enable the source apparatus 12 to directly transmit the encoded video data to the destination apparatus 14 in real time. In this example, the source apparatus 12 may modulate the encoded video data according to a communication standard (for example, a wireless communication protocol), and may transmit modulated video data to the destination apparatus 14. The one or more communications media may include a wireless communications medium and/or a wired communications medium such as a radio frequency (RF) spectrum or one or more physical transmission lines. The one or more communications media may form a part of a packet-based network (for example, a local area network, a wide area network, or a global network (for example, the Internet)). The one or more communications media may include a router, a switch, a base station, or another device that facilitates communication from the source apparatus 12 to the destination apparatus 14.

For another example, the channel 16 may include a storage medium for storing the encoded video data generated by the source apparatus 12. In this example, the destination apparatus 14 may access the storage medium through disk access or card access. There may be a plurality of local access data storage media such as a BLU-RAY DISC, a digital versatile disc (DVD), a compact disc read-only memory (CD-ROM), a flash memory, or another appropriate digital storage medium for storing the encoded video data.

For another example, the channel 16 may include a file server or another intermediate storage apparatus for storing the encoded video data generated by the source apparatus 12. In this example, the destination apparatus 14 may access, through streaming transmission or downloading, the encoded video data stored on the file server or the other intermediate storage apparatus. The file server may be a type of server that can store the encoded video data and that can transmit the encoded video data to the destination apparatus 14. For example, the file server may include a web server (for example, used for a website), a file transfer protocol (FTP) server, a network-attached storage (NAS) apparatus, and a local disk drive.

The destination apparatus 14 may access the encoded video data through a standard data connection (for example, an Internet connection). Examples of the data connection include a wireless channel (for example, a WI-FI connection), a wired connection (for example, a Digital Subscriber Line (DSL) or a cable modem), or a combination thereof adapted to access the encoded video data stored on the file server. The encoded video data may be transmitted from the file server through streaming transmission, downloading transmission, or a combination thereof.

The image filtering method in this application is not limited to a wireless application scenario. For example, the image filtering method may be applied to a plurality of multimedia applications such as air television broadcasting, cable television transmitting, satellite television transmitting, video streaming transmission (for example, through the Internet), encoding of video data stored on a data storage medium, decoding of video data stored on a data storage medium, or another application. In some examples, the video encoding and decoding system 10 may be applied to support unidirectional or bidirectional video transmission to support applications such as video streaming transmission, video play, video broadcasting, and/or a video call.

In the example of FIG. 16, the source apparatus 12 includes a video source 18, a video encoder 20, and an output interface 22. In some examples, the output interface 22 may include a modulator/demodulator (modem) and/or a transmitter. The video source 18 may include a video capture apparatus (for example, a video camera), a video file including previously captured video data, a video input interface that is configured to receive video data from a video content provider, and/or a computer graphics system that is configured to generate video data, or a combination of the foregoing video data sources.

The video encoder 20 may encode video data that comes from the video source 18. In some examples, the source apparatus 12 directly transmits encoded video data to the destination apparatus 14 through the output interface 22. The encoded video data may also be stored on a storage medium or a file server for later access by the destination apparatus 14 for decoding and/or playing.

In the example of FIG. 16, the destination apparatus 14 includes an input interface 28, a video decoder 30, and a display apparatus 32. In some examples, the input interface 28 includes a receiver and/or a modem. The input interface 28 may receive the encoded video data through the channel 16. The display apparatus 32 may be integrated with the destination apparatus 14 or may be external to the destination apparatus 14. The display apparatus 32 usually displays decoded video data. The display apparatus 32 may include a plurality of display apparatuses such as a liquid crystal display (LCD), a plasma display, an organic light-emitting diode (OLED) display, or another type of display apparatus.

The video encoder 20 and the video decoder 30 may operate according to a video compression standard (for example, HEVC H.265 standard), and may follow an HEVC test model (HM). The H.265 standard includes a plurality of released versions. For example, Telecommunication Standardization Sector of the International Telecommunications Union (ITU-T) H.265 (V3) (04/2015) was released on Apr. 29, 2015 and can be downloaded from http://handle.itu.int/11.1002/1000/12455. All content of the file is incorporated herein by reference.

It should be understood that in the implementations provided in this application, "B corresponding to A" indicates that B is associated with A, and B may be determined based on A. However, it should be further understood that determining A based on B does not mean that B is determined based on A only, and B may be determined based on A and/or other information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored on a computer-readable storage medium. Based on such an understanding, the technical solutions of this application essentially, or the part contributing to other approaches, or some of the technical solutions may be implemented in a form of a software product. The computer software product is stored on a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image filtering method, comprising:
   determining a filter coefficient of a chroma filter based on a filter coefficient of a luma filter, wherein all filter coefficients of the luma filter are in a first geometric distribution, wherein all filter coefficients of the chroma filter are in a second geometric distribution, and wherein a first filter coefficient of the chroma filter at an edge of the second geometric distribution is calculated using more than one second filter coefficient of the luma filter at the first geometric distribution;
   performing first filtering processing on luma samples of a to-be-processed image using the luma filter; and
   performing second filtering processing on chroma samples of the to-be-processed image using the chroma filter,
   wherein a filter coefficient distribution of the luma filter being the first geometric distribution is shown in the following table:

|     |     |     |     | L0  |     |     |     |     |
| --- | --- | --- | --- | --- | --- | --- | --- | --- |
|     |     |     | L1  | L2  | L3  |     |     |     |
|     |     | L4  | L5  | L6  | L7  | L8  |     |     |
|     | L9  | L10 | L11 | L12 | L13 | L14 | L15 |     |
| L16 | L17 | L18 | L19 | L20 | L19 | L18 | L17 | L16 |
|     | L15 | L14 | L13 | L12 | L11 | L10 | L9  |     |
|     |     | L8  | L7  | L6  | L5  | L4  |     |     |
|     |     |     | L3  | L2  | L1  |     |     |     |
|     |     |     |     | L0  |     |     |     |     | wherein a filter coefficient distribution of the chroma filter being the second geometric distribution is shown in the following table:

|     |     | C0  |     |     |
| --- | --- | --- | --- | --- |
|     | C1  | C2  | C3  |     |
| C4  | C5  | C6  | C5  | C4  |
|     | C3  | C2  | C1  |     |
|     |     | C0  |     |     | and
wherein the first filter coefficient of the chroma filter at an edge of the second geometric distribution comprises: C0, C1, C3, and C4.

2. The image filtering method of claim 1, wherein determining the filter coefficient of the chroma filter comprises:
   determining, based on a first-type filter coefficient of the luma filter, a third-type filter coefficient of the chroma filter; and
   determining, based on a second-type filter coefficient of the luma filter, a fourth-type filter coefficient of the chroma filter, wherein the fourth-type filter coefficient is a filter coefficient of the chroma filter at the edge of the second geometric distribution, wherein the third-type filter coefficient is a filter coefficient of the chroma filter other than the fourth-type filter coefficient, wherein the first-type filter coefficient is at a same location relative to a first geometric center in the first geometric distribution as the third-type filter coefficient relative to a second geometric center in the second geometric distribution, and wherein the second-type filter coefficient is a filter coefficient of the luma filter other than the first-type filter coefficient.

3. The image filtering method of claim 2, wherein determining the third-type filter coefficient comprises assigning a value of a first luma filter coefficient in the first-type filter coefficient to a value of a first chroma filter coefficient in the third-type filter coefficient, and wherein a location of the first chroma filter coefficient relative to the first geometric center is the same as a location of the first luma filter coefficient relative to the first geometric center.

4. The image filtering method of claim 3, wherein the luma filter is a tap filter with a 9×9 diamond shape, wherein the chroma filter is a tap filter with a 5×5 diamond shape, wherein the first geometric distribution is a 9×9 diamond distribution, wherein the second geometric distribution is a 5×5 diamond distribution, wherein the first-type filter coefficient comprises L20, L12, and L19, wherein the third-type filter coefficient comprises C6, C2, and C5, wherein the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a first raster scanning order, and the filter coefficients of the chroma filter are C0, C1, C2, C3, C4, C5, C6, C5, C4, C3, C2, C1, and C0 in the 5×5 diamond distribution based on a second raster scanning order, and wherein assigning a value of a first luma filter coefficient in the first-type filter coefficient to a first chroma filter coefficient in the third-type filter coefficient comprises: setting L20 as C6;

setting L12 as C2; and setting L19 as C5.

5. The image filtering method of claim 2, wherein determining the fourth-type filter coefficient comprises setting a sum of a value of a second luma filter coefficient in the second-type filter coefficient and a value of at least one third luma filter coefficient that has a neighborhood relationship with the second luma filter coefficient as a value of a second chroma filter coefficient in the fourth-type filter coefficient, and wherein a location of the second chroma filter coefficient relative to the second geometric center is the same as a location of the second luma filter coefficient relative to the first geometric center.

6. The image filtering method of claim 5, wherein the at least one third luma filter coefficient having the neighborhood relationship with the second luma filter coefficient comprises a second-type filter coefficient adjacent to or spaced by K from the second luma filter coefficient in the first geometric distribution, and wherein K is an integer greater than or equal to one.

7. The image filtering method of claim 5, wherein the luma filter is a tap filter with a 9×9 diamond shape, wherein the chroma filter is a tap filter with a 5×5 diamond shape, wherein the first geometric distribution is a 9×9 diamond distribution, wherein the second geometric distribution is a 5×5 diamond distribution, wherein the second-type filter coefficient comprises L0, L1, L2, L3, L4, L5, L6, L7, L8, L9, L10, L11, L13, L14, L15, L16, L17, and L18, wherein the fourth-type filter coefficient comprises C0, C1, C3, and C4, wherein the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a first raster scanning order, wherein the filter coefficients of the chroma filter are C0, C1, C2, C3, C4, C5, C6, C5, C4, C3, C2, C1, and C0 in the 5×5 diamond distribution based on a second raster scanning order, and wherein setting the sum of the value of the second luma filter coefficient and the value of the at least one third luma filter coefficient as the value of the second chroma filter coefficient comprises:

setting a sum of L1, L2, L3, L0, and L6 as C0;

setting a sum of L4, L5, L10, and L11 as C1;

setting a sum of L7, L8, L13, and L14 as C3; and setting a sum of L9, L15, L16, L17, and L18 as C4.

8. The image filtering method of claim 2, wherein a quantity of taps of the luma filter is greater than or equal to a preset value.

9. The image filtering method of claim 1, wherein determining the filter coefficient of the chroma filter comprises:

determining a quantity of taps of the luma filter;

determining that the quantity of taps of the luma filter is less than a preset value; and setting the filter coefficient of the luma filter as the filter coefficient of the chroma filter.

10. The image filtering method of claim 9, wherein setting the filter coefficient of the luma filter as the filter coefficient of the chroma filter comprises setting a fourth luma filter coefficient of the luma filter as a fourth chroma filter coefficient of the chroma filter, and wherein a location of the fourth chroma filter coefficient relative to a second geometric center in the second geometric distribution is the same as a location of the fourth luma filter coefficient relative to a first geometric center in the first geometric distribution.

11. The image filtering method of claim 1, wherein before determining the filter coefficient of the chroma filter, the image filtering method further comprises:

determining types of the luma samples to obtain a plurality of luma sample types;

determining types of the chroma samples to obtain a plurality of chroma sample types, wherein any one of the chroma sample types is the same as a luma sample type corresponding to a same sampling location; and determining luma filtering identification information of a luma sample, wherein the luma filtering identification information instructs to perform third filtering processing on the luma sample and a chroma sample at a corresponding sampling location.

12. The image filtering method of claim 1, wherein the image filtering method is applied to a decoder, and wherein before determining the filter coefficient of the chroma filter, the image filtering method further comprises parsing a bitstream to obtain the filter coefficient of the luma filter.

13. The image filtering method of claim 1, wherein the image filtering method is applied to an encoder, and wherein the image filtering method further comprises encoding the filter coefficient of the luma filter.

14. The image filtering method of claim 1, wherein a relationship between filter coefficients of the luma filter and filter coefficients of the chroma filter is as follows:

$C6=L20$;

$C2=L12$;

$C5=L19$;

$$C0 = 11 \times L1 + 12 \times L2 + 13 \times L3 + 10 \times L0 + 16 \times L6;$$

$$C1 = 14 \times L4 + 15 \times L5 + 110 \times L10 + 111 \times L11;$$

$$C3 = 17 \times L7 + 18 \times L8 + 113 \times L13 + 114 \times L14; \text{ and}$$

$$C4 = 19 \times L9 + 115 \times L15 + 116 \times L16 + 117 \times L17 + 118 \times L18,$$

wherein 11, 12, 13, 10, 16, 14, 15, 110, 111, 17, 18, 113, 114, 19, 115, 116, 117, and 118 are weighting coefficients.

15. An image filtering apparatus, comprising:

a non-transitory memory storage configured to store instructions; and a processor coupled to the non-transitory memory storage, wherein the instructions cause the processor to be configured to:

determine a filter coefficient of a chroma filter based on a filter coefficient of a luma filter, wherein all filter coefficients of the luma filter are in a first geometric distribution, wherein all filter coefficients of the chroma filter are in a second geometric distribution, and wherein a first filter coefficient of the chroma filter at an edge of the second geometric distribution is calculated using more than one second filter coefficient of the luma filter at the first geometric distribution;

perform first filtering processing on luma samples of a to-be-processed image using the luma filter; and perform second filtering processing on chroma samples of the to-be-processed image using the chroma filter, wherein a filter coefficient distribution of the luma filter being the first geometric distribution is shown in the following table:

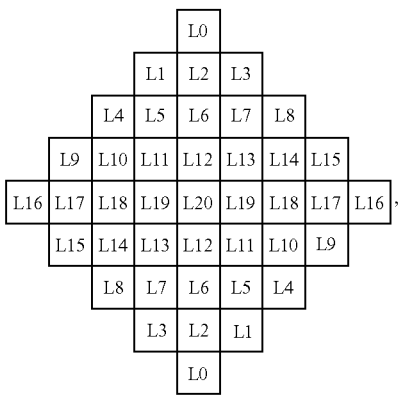 [SMILES: C1CC23CC45CC67CC89CCC8%10CC8%11CC%12%13CC%14%15CCC%14%16CC%14%17CC%18%19CC%20%21CCC%20%22CC%20%23CC%24%25CC12C%241C34C23C56C45C97C%108C46C%11%12C47C%15%13C%16%14C48C%18%17C49C%21%19C%22%20C4%10C%25%23C12C%101C35C67C981]

wherein a filter coefficient distribution of the chroma filter being the second geometric distribution is shown in the following table:

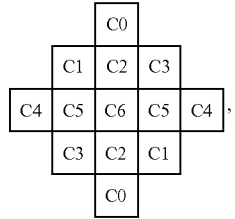

and wherein the first filter coefficient of the chroma filter at an edge of the second geometric distribution comprises: C0, C1, C3, and C4.

16. The image filtering apparatus of claim 15, wherein the instructions further cause the processor to be configured to:
determine, based on a first-type filter coefficient of the luma filter, a third-type filter coefficient of the chroma filter; and
determine, based on a second-type filter coefficient of the luma filter, a fourth-type filter coefficient of the chroma filter, wherein the fourth-type filter coefficient is a filter coefficient of the chroma filter at the edge of the second geometric distribution, wherein the third-type filter coefficient is a filter coefficient of the chroma filter other than the fourth-type filter coefficient, wherein the first-type filter coefficient is at a same location relative to a first geometric center in the first geometric distribution as the third-type filter coefficient relative to a second geometric center in the second geometric distribution, and wherein the second-type filter coefficient is a filter coefficient of the luma filter other than the first-type filter coefficient.

17. The image filtering apparatus of claim 16, wherein the instructions further cause the processor to be configured to assign a value of a first luma filter coefficient in the first-type filter coefficient to a value of a first chroma filter coefficient in the third-type filter coefficient, and wherein a location of the first chroma filter coefficient relative to the second geometric center is the same as a location of the first luma filter coefficient relative to the first geometric center.

18. The image filtering apparatus of claim 17, wherein the luma filter is a tap filter with a 9×9 diamond shape, wherein the chroma filter is a tap filter with a 5×5 diamond shape, wherein the first geometric distribution is a 9×9 diamond distribution, wherein the second geometric distribution is a 5×5 diamond distribution, wherein the first-type filter coefficient comprises L20, L12, and L19, wherein the third-type filter coefficient comprises C6, C2, and C5, wherein the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a first raster scanning order, wherein filter coefficients of the chroma filter are C0, C1, C2, C3, C4, C5, C6, C5, C4, C3, C2, C1, and C0 in the 5×5 diamond distribution based on a second raster scanning order, and wherein the instructions further cause the processor to be configured to:
set L20 as C6;
set L12 as C2; and
set L19 as C5.

19. The image filtering apparatus of claim 16, wherein the instructions further cause the processor to be configured to set a sum of a value of a second luma filter coefficient in the second-type filter coefficient and a value of at least one third luma filter coefficient that has a neighborhood relationship with the second luma filter coefficient as a value of a second chroma filter coefficient in the fourth-type filter coefficient, and wherein a location of the second chroma filter coefficient relative to the second geometric center is the same as a location of the second luma filter coefficient relative to the first geometric center.

20. The image filtering apparatus of claim 19, wherein the at least one third luma filter coefficient having the neighborhood relationship with the second luma filter coefficient comprises a second-type filter coefficient adjacent to or spaced by K from the second luma filter coefficient in the first geometric distribution, and wherein K is an integer greater than or equal to one.

21. The image filtering apparatus of claim 19, wherein the luma filter is a tap filter with a 9×9 diamond shape, wherein the chroma filter is a tap filter with a 5×5 diamond shape, wherein the first geometric distribution is a 9×9 diamond distribution, wherein the second geometric distribution is a 5×5 diamond distribution, wherein the second-type filter coefficient comprises L0, L1, L2, L3, L4, L5, L6, L7, L8, L9, L10, L11, L13, L14, L15, L16, L17, and L18, wherein the fourth-type filter coefficient comprises C0, C1, C3, and C4, wherein the filter coefficients of the luma filter are L0, L1, L2, L3, L4, L5, L6, L7, L8, L9, L10, L11, L12, L13, L14, L15, L16, L17, L18, L19, L20, L19, L18, L17, L16, L15, L14, L13, L12, L11, L10, L9, L8, L7, L6, L5, L4, L3, L2, L1, and L0 in the 9×9 diamond distribution based on a first raster scanning order, wherein the filter coefficients of the chroma filter are C0, C1, C2, C3, C4, C5, C6, C5, C4, C3, C2, C1, and C0 in the 5×5 diamond distribution based on a second raster scanning order, and wherein the instructions further cause the processor to be configured to:
set a sum of L1, L2, L3, L0, and L6 as C0;
set a sum of L4, L5, L10, and L11 as C1;
set a sum of L7, L8, L13, and L14 as C3; and
set a sum of L9, L15, L16, L17, and L18 as C4.

22. The image filtering apparatus of claim 16, wherein the instructions further cause the processor to be configured to determine that a quantity of taps of the luma filter is greater than or equal to a preset value.

23. The image filtering apparatus of claim 15, wherein the instructions further cause the processor to be configured to:
determine a quantity of taps of the luma filter;

determine that the quantity of taps of the luma filter is less than a preset value; and set the filter coefficient of the luma filter as the filter coefficient of the chroma filter.

24. The image filtering apparatus of claim 23, wherein the instructions further cause the processor to be configured to set a fourth luma filter coefficient of the luma filter as a fourth chroma filter coefficient of the chroma filter, and wherein a location of the fourth chroma filter coefficient relative to a second geometric center in the second geometric distribution is the same as a location of the fourth luma filter coefficient relative to a first geometric center in the first geometric distribution.

25. The image filtering apparatus of claim 15, wherein the instructions further cause the processor to be configured to:
   determine types of the luma samples to obtain a plurality of luma sample types;
   determine types of the chroma samples to obtain a plurality of chroma sample types, wherein any one of the chroma sample types is the same as a luma sample type corresponding to a same sampling location; and
   determine luma filtering identification information of a luma sample, wherein the luma filtering identification information instructs to perform third filtering processing on the luma sample and a chroma sample at a corresponding sampling location.

26. The image filtering apparatus of claim 15, wherein a relationship between filter coefficients of the luma filter and filter coefficients of the chroma filter is as follows:

C6=L20;
C2=L12;
C5=L19;

$$C0=11\times L1+12\times L2+13\times L3+10\times L0+16\times L6;$$

$$C1=14\times L4+15\times L5+110\times L10+111\times L11;$$

$$C3=17\times L7+18\times L8+113\times L13+114\times L14;\text{ and}$$

$$C4=19\times L9+115\times L15+116\times L16+117\times L17+118\times L18,$$

wherein 11, 12, 13, 10, 16, 14, 15, 110, 111, 17, 18, 113, 114, 19, 115, 116, 117, and 118 are weighting coefficients.

27. A computer program product comprising computer-executable instructions for storage on a non-transitory computer readable medium that, when executed by a processor, cause an apparatus to:
   determine a filter coefficient of a chroma filter based on a filter coefficient of a luma filter, wherein all filter coefficients of the luma filter are in a first geometric distribution, wherein all filter coefficients of the chroma filter are in a second geometric distribution, and wherein a first filter coefficient of the chroma filter at an edge of the second geometric distribution is calculated using more than one second filter coefficient of the luma filter at the first geometric distribution;
   perform first filtering processing on luma samples of a to-be-processed image using the luma filter; and
   perform second filtering processing on chroma samples of the to-be-processed image using the chroma filter,
   wherein a filter coefficient distribution of the luma filter being the first geometric distribution is shown in the following table:

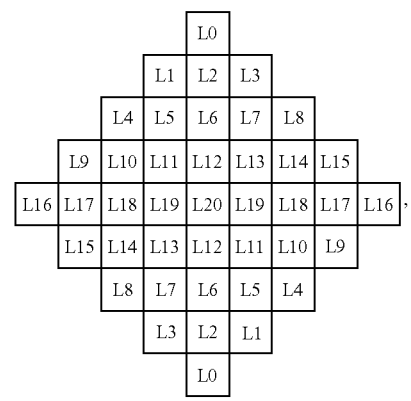 [SMILES: C1CC23CC45CC67CC89CCC8%10CC8%11CC%12%13CC%14%15CCC%14%16CC%14%17CC%18%19CC%20%21CCC%20%22CC%20%23CC%24%25CC12C%241C34C23C56C45C97C%108C46C%11%12C47C%15%13C%16%14C48C%18%17C49C%21%19C%22%20C4%10C%25%23C12C%101C35C67C981]

wherein a filter coefficient distribution of the chroma filter being the second geometric distribution is shown in the following table:

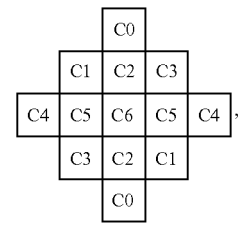

and
wherein the first filter coefficient of the chroma filter at an edge of the second geometric distribution comprises: C0, C1, C3, and C4.

* * * * *